(12) United States Patent
Gray, Jr.

(10) Patent No.: US 11,959,745 B2
(45) Date of Patent: Apr. 16, 2024

(54) ENVIRONMENT SENSOR PLATFORM, SYSTEM AND METHOD

(71) Applicant: Green Stream Technologies, Inc., Wake Forest, NC (US)

(72) Inventor: James R. Gray, Jr., Wake Forest, NC (US)

( * ) Notice: Subject to any disclaimer, the term of this patent is extended or adjusted under 35 U.S.C. 154(b) by 64 days.

(21) Appl. No.: 17/571,933

(22) Filed: Jan. 10, 2022

(65) Prior Publication Data

US 2022/0155071 A1    May 19, 2022

Related U.S. Application Data

(63) Continuation-in-part of application No. 16/194,272, filed on Nov. 16, 2018, now Pat. No. 11,221,249.

(51) Int. Cl.
*G01C 13/00* (2006.01)
*H04L 51/046* (2022.01)
*H04W 4/20* (2018.01)
*H04W 4/38* (2018.01)

(52) U.S. Cl.
CPC .......... *G01C 13/008* (2013.01); *H04L 51/046* (2013.01); *H04W 4/20* (2013.01); *H04W 4/38* (2018.02)

(58) Field of Classification Search
CPC ..... G01C 13/008; G01C 13/00; H04L 51/046; H04L 67/10; H04L 67/12; H04L 67/52; H04W 4/20; H04W 4/38; H04W 4/021; H04W 4/70; H04W 4/90

USPC .............................................. 705/55; 702/55
See application file for complete search history.

(56) References Cited

U.S. PATENT DOCUMENTS

| | | | | |
|---|---|---|---|---|
| 5,869,759 | A * | 2/1999 | Seigel | G01V 7/16 73/382 R |
| 7,729,880 | B1 * | 6/2010 | Mashburn | H04L 67/12 702/151 |
| 10,051,845 | B1 * | 8/2018 | Massaro | A01K 29/005 |
| 2012/0197555 | A1 * | 8/2012 | Cheng | G01F 23/02 73/290 V |
| 2014/0069186 | A1 * | 3/2014 | Knowles | G01F 1/74 73/290 V |
| 2015/0149617 | A1 * | 5/2015 | Lai | H04L 43/08 709/224 |

(Continued)

*Primary Examiner* — Omar Casillashernandez

(57) ABSTRACT

The instant innovation presents a real-time environmental-sensing platform and system and method for water level monitoring, reporting and human warning. The platform, system, and method monitors rising water levels throughout a given geographical area and provides real-time and trending data on flooding and flooding risks. The instant innovation utilizes an environmental sensing platform comprised of a plurality of sensor nodes that may be geographically dispersed for both collecting environmental data on a regular or variable-frequency schedule, and transmitting the environmental data. The instant innovation further utilizes one or more wireless communication protocols configured to receive and transmit the environmental data, a cloud platform configured to receive, store, analyze and support real-time stream processing of the environmental data and generating environmental data reports thereof, and an external device for receiving, relaying and/or displaying report and alert information received from the cloud platform.

20 Claims, 17 Drawing Sheets

(56) References Cited

U.S. PATENT DOCUMENTS

2018/0375680 A1* 12/2018 Wright ................ F24D 19/1048
2019/0122129 A1* 4/2019 Alsubai .................. G06Q 50/06

* cited by examiner

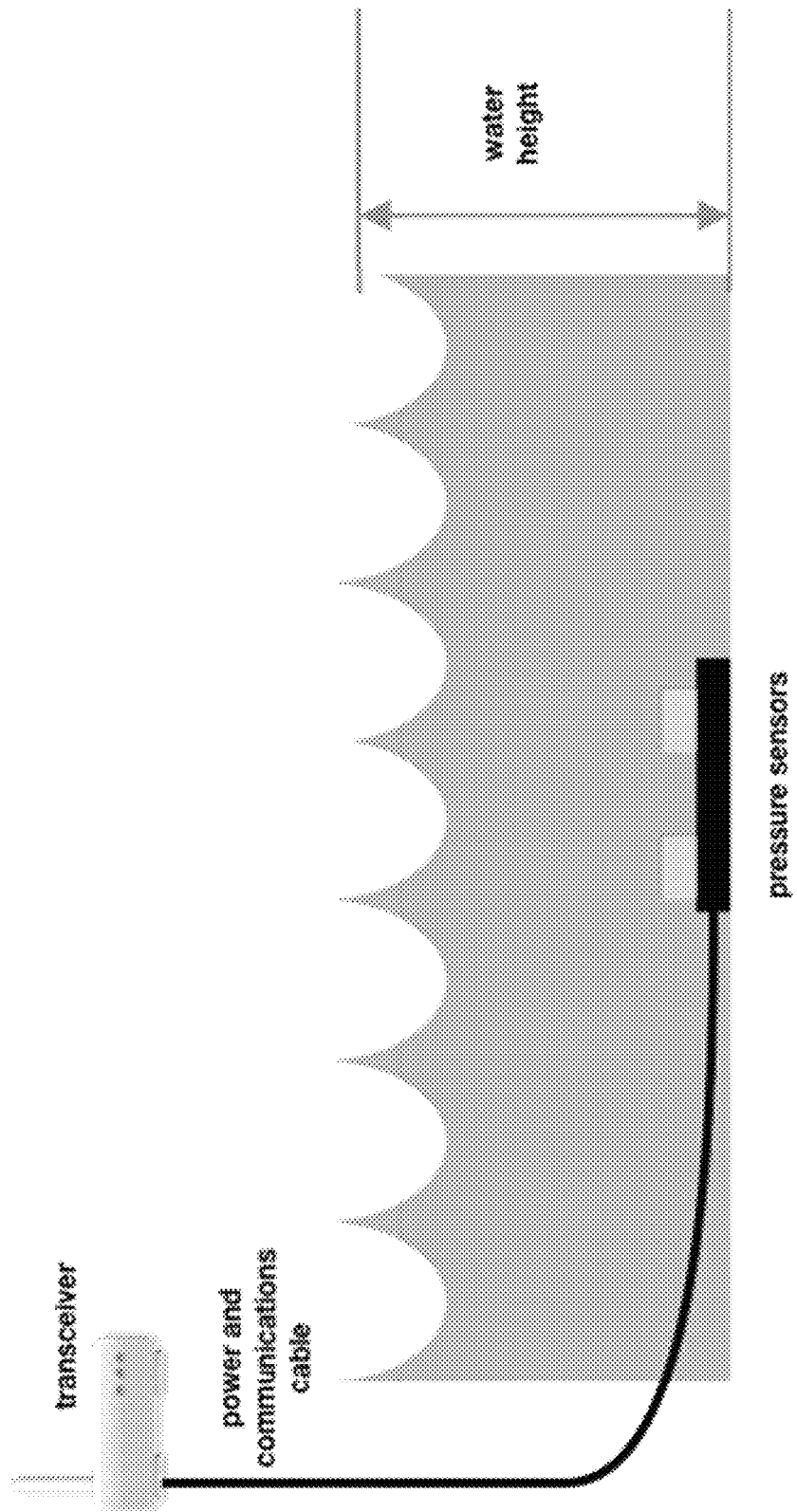

ENVIRONMENT SENSOR PLATFORM, SYSTEM AND METHOD

CROSS-REFERENCE TO RELATED APPLICATION

This application is a continuation-in-part of U.S. application Ser. No. 16/194,272, filed Nov. 16, 2018, and entitled "Environmental Sensor Platform, System and Method", which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

More than 1 billion people in the world live in low-lying coastal regions susceptible to flooding. In the United States, 130 million people, about 39% of the population, live in coastal and riverine cities and counties. Every year, more people are attracted to living near waterways.

Commercial activities mostly related to port, shipping, industry, agriculture, etc. have engendered commercial and employment hubs near waterways that attract increasing numbers of people. Moreover, aside from commercial and employment reasons, people are attracted to coastal and riverine metro areas because they offer residents attractions such as boating beaches, and watersports. These coastal and riverine areas are typically low-lying and threatened by flooding from proximal large bodies of water such as an ocean, bay, river, or lake. Flooding threatens infrastructure, property and people. For example, on the US East Coast alone, tidal flooding threatens more than 7,500 miles of roadway. In addition, flash floods in plains, mountain, and desert topographies can result in especially dangerous inland flooding.

Flooding in these regions can be caused by any of the following factors, and often by a combination of them: a) storm surge b) excessively high tides c) heavy or prolonged rainfall d) strong wind action, such as a noCr'easter e) rising rivers and creeks f) snow melt g) burn scars.

Moreover, flood events in these coastal and riverine areas are increasing in frequency and severity due to changes in the environment. Sea levels have been rising around the World over the last 80 years; they will continue to rise at an increasing rate. For example, since 1927, sea levels have risen in Norfolk Virginia by an average of 4.5 mm/year. This equates to a 9-inch increase between 1968 and 2018. Scientists forecast an additional 9 to 10-inch increase by 2050. Sea level rise exacerbates tidal flooding and storm surge, as higher water comes further inland, causing deeper flooding.

Storms with excessive wind and rain are becoming more frequent, more severe and more prolonged as weather patterns shift. Warmer seas produce more and stronger tropical storms and hurricanes. Furthermore, urban development means less water is absorbed into nature and is channeled through streets, overwhelming storm drains. As populations in flood-prone areas continue to increase, and flooding becomes more frequent and more severe, people, property, and infrastructure will be increasingly impacted by the safety risks and economic losses caused by flooding.

In addition to mitigating safety and economic concerns, there are myriad other reasons to monitor environmental water levels. These reasons include but are not limited to drought monitoring, enabling land restoration and/or conservation, and furthering academic studies. Similarly, the fields of agriculture, aquaculture (including fisheries maintenance), watersports and construction benefit from regular water level observation and record-keeping.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 17 is an illustrative diagram show an example contact water level sensor providing a measured depth consistent with certain embodiments of the present invention.

DETAILED DESCRIPTION

Figure 1:
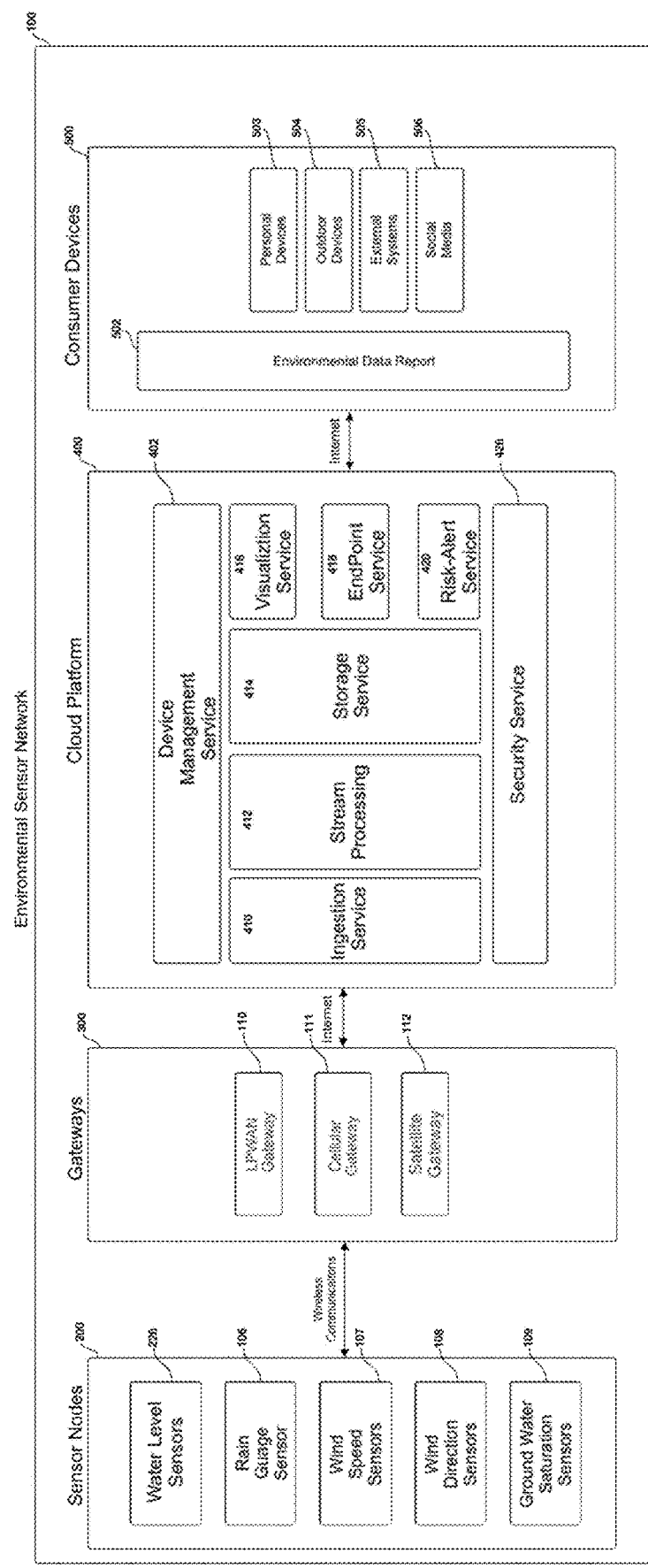
FIG. 1 is a diagram illustrating an example of the environmental sensor network consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms 'activation' and 'action of the user', as used herein, may refer to application of the dispensing force to the actuation button.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

What is desired is a real-time environmental sensing platform, system and method for water level monitoring, reporting and warning. The platform, system and method monitor rising water levels throughout a given geographical area which provides real-time and trending data on flooding.

The real-time environmental sensing platform, system, and method herein described may be configured to monitor water and precipitation levels throughout a metropolitan area or other geographical area located near one or more bodies of water or other areas that are prone to flooding. This real-time environmental sensing platform is herein defined as the Environmental Sensor Network (ESN). In an embodiment, the ESN may comprise a network of environmental Internet of Things (IoT) devices, sensors, and software modules which may be configured to collect and transmit environmental data to a cloud platform for storage, processing, analysis, and reporting to one or more users of the ESN platform.

In an embodiment, the ESN may comprise a plurality of sensor nodes that may be geographically dispersed for collecting and transmitting environmental data; one or more wireless communication protocol infrastructure configured to receive and transmit the environmental data; a cloud platform configured to receive, store, analyze and support real-time stream processing of the environmental data and generating environmental data reports thereof; and a consumer external device for receiving, relaying and/or displaying report and alert information received from the cloud platform. The embodiment may produce data able to be reviewed and/or consumed by researchers or accessed on government platforms such as, but not limited to, fiman.nc.gov and/or weather.gov.

In this embodiment, the cloud platform may be configured to support real-time stream processing of sensor node environmental data and other externally received data in order to derive an environmental data report which is transmitted to certain consumer external devices comprising environmental changes, trends and conditions in predefined geographical areas. Moreover, in certain embodiments, the cloud platform utilizes an alert service that is configured to transmit a report or an alert when certain parameters exceed predefined thresholds. In a non-limiting example, emergency alerts can be automatically sent to all citizen's mobile devices in a geographical area if certain parameters, such as but not limited to, water levels, exceed certain heights as an emergency service.

In an embodiment, at the periphery of the ESN platform and at the head of each data stream are a plurality of geographically positioned sensor nodes that are configured to collect, format, and transmit environmental data in the form of messages whose final destination and cumulation is a cloud platform which may comprise one or more cloud-based servers.

In an embodiment, the plurality of sensor nodes may utilize electronic sensors and micro-controllers to gather environmental data about the adjacent physical environment, format and package the environmental data in the form of one or more messages and transmit the one or more messages wirelessly to the cloud platform by way of a network gateway. Each sensor node is identified by a unique device identifier, which may allow each sensor node to be identified and managed by the ESN platform and the one or more cloud servers. In an embodiment, a sensor node may include one or more cameras and utilize the imagery captured through a computerized vision analysis algorithm to provide additional information about water levels, the physical location and size of an area covered by water, and whether the water may be contaminated or otherwise contain items and objects other than the water itself. In an embodiment, sensor nodes may include rain gauges, temperature sensors, and/or other environmental sensors, or sensor nodes may include a combination of rain gauges, temperature sensors, and/or other environmental sensors.

In an embodiment, the sensor nodes may generally comprise at least one environmental detector configured to collect environmental data, a data collection module (DCM) for providing computer logic embedded within one or more software modules for sensor node operation, a sensor telemetry module configured to transmit the collected environmental data to the network, and a power module for providing a power source for all elements of the sensor node that require electrical power.

In an embodiment, the sensor nodes may be designed to be modular and self-contained, whereby the number of sensor nodes may be easily increased or decreased for the installed ESN platform to expand, contract, or modify the area of coverage for the ESN platform deployed in a given geographic environment. The sensor nodes may be configured to measure conditions by collecting and transmitting environmental data for the geographical area in which the ESN platform sensors are installed at predetermined times, predetermined time intervals, and/or at varying periodic time intervals.

In an embodiment, the DCM may comprise a computer having a microprocessor and computer readable medium having programable input/output peripherals configured to manage all aspects and functions of the sensor nodes as a self-contained system including the environmental detectors. In this embodiment, the DCM computer may ideally be an ultra-low power micro controller ("UMCU") designed for embedded applications. The UMCU may be configured with one or more microprocessors along with non-volatile memory encoded with instructions. The UMCU may also contain a small amount of volatile memory which may be used to store environmental data in the event of loss of communications. The DCM may contain a real-time clock that supports the DCM with the reporting of environmental data at defined time intervals or at one or more given points in time. In a non-limiting example, the DCM may report environmental data at a pre-configured number of minutes past the hour. In an embodiment, the DCM may contain a watchdog timer that monitors microprocessor activity and may reset the DCM in the event of failure.

In an embodiment, the sensor nodes may be equipped with one or more varying environmental sensor detectors for gathering environmental data including but not limited to environmental detectors. The environmental detectors may measure rainfall, air humidity, barometric pressure, air temperature, and distance between the sensor node and water surface.

In an embodiment, one or more of the sensor nodes are geographically positioned near one or more bodies of water or above ground which may be prone to flooding. Each individual sensor node is associated with a predetermined geographical location, wherein each sensor node comprises an environmental detector which may be configured to collect environmental data pertaining to water level elevation and changes in water level elevation over time at the given geographical location relative to a vertical datum such as, but not limited to, mean sea level (MSL) and/or North American Vertical Datum of 1988 (NAV88).

In an embodiment, the sensor nodes are operably positioned above the adjacent water surface and the water level sensor is generally configured to measure the distance from the sensor node to the water's surface, determining a measurement of water level elevation when compared to a standard reference datum, zero reference value or defined offset value. The measured distance between the water's surface and the sensor node is compared to the zero-reference value or offset value to indicate change in water level height and depth.

In an embodiment, the water level detector may use an ultrasonic sensor to measure the distance between the water surface and the sensor node. An ultrasonic sensor is a straightforward, non-contact approach to detect the elevation of a body of water, providing a means of measuring water elevation in most locations. Ultrasonic sensors may measure the distance from the water level sensor to any object placed in its path by using sound waves. An Ultrasonic sensor measures distance by sending out a sound wave at a specific frequency and listening for the return of the sound wave when it bounces back. By recording the elapsed time between the sound wave being generated and the sound wave return, it is possible to calculate the distance between the ultrasonic sensor and the surface of the water. A water level sensor, in particular the ultrasonic sensor, may be mounted external or flush with respect to the sensor node housing in order to properly operate and expose the water level sensor to the nearby water surface.

In an embodiment, the water level detector may use a radar sensor to measure the distance between the water surface and the sensor node. A radar sensor is a non-contact approach to detect the elevation of a body of water, providing a means of measuring water elevation in areas where an ultrasonic sensor's accuracy may be affected by temperature changes or interference by mist, dust, or vegetation or when the distance to the water is beyond the capability of an ultrasonic sensor. Radar sensors may measure the distance from the water level sensor to any object placed in its path by using electromagnetic waves. A radar sensor measures distance by sending out an electromagnetic wave at a specific frequency and detecting the wave when it bounces back from its target. By recording the elapsed time, or the phase shift, between the electromagnetic wave being generated and the electromagnetic wave return, it is possible to calculate the distance between the radar sensor and the surface of the water.

In an embodiment, a rainfall detector may use a tipping bucket rain gauge to measure the intensity of rainfall, as well as the amount of rainfall accumulated in a specified period of time, such as, in a non-limiting example, one day. A tipping bucket contains cups inside the tipping bucket housing that fill with water as rain funnels down into the housing. By measuring the number of tips and the speed with which the cups tip, it is possible to calculate rain intensity and rain accumulation.

In an embodiment, a rainfall detector may use an optical rain gauge to measure the intensity of rainfall, as well as the amount of rainfall accumulated over a specified period of time, such as, in a non-limiting example, one day. An optical rain gauge detects the size and shape of rain drops splattering against the dome of the optical rain gauge. By measuring the size of the drops and the time between drops, it is possible to calculate rain intensity and rain accumulation.

A water level sensor, regardless of sensor type, may be mounted external or flush with respect to the sensor node housing in order to properly operate and expose the water level sensor to the nearby water surface.

Turning now to FIG. 1, the figure shows a non-limiting example version of the Environmental Services Network (ESN) 100 consistent with certain embodiments of the invention. In the embodiment, the ESN 100 comprises a network of environmental Internet of Things ("IoT") which is configured to collect and transmit environmental data to a cloud platform 400 for storage, processing, analysis and reporting.

The ESN 100 generally comprises a plurality of sensor nodes 200 geographically dispersed for collecting and transmitting environmental data; one or more wireless communication protocol infrastructure 300 configured to receive and transmit the environmental data; a cloud platform 400 configured to receive, store, analyze and support real-time stream processing of the environmental data and generating environmental data reports 502 thereof; and a consumer external device 500 for receiving, relaying and/or displaying report and alert information received from the cloud platform 400.

In an embodiment, the cloud platform 400 is configured to support real-time stream processing of sensor node 200 environmental data and other externally received data in order to derive an environmental data report 502 which is transmitted to certain consumer external devices 500 comprising environmental changes, trends and conditions in predefined geographical areas. The cloud platform 400 utilizes an alert service 420 that is configured to transmit a report or an alert when certain parameters exceed predefined thresholds. In a non-limiting example, emergency alerts can be automatically sent to all citizens' mobile devices 503 in a geographical area if certain parameters, such as, but not limited to, water levels, exceed certain heights as an emergency service.

Figure 2:
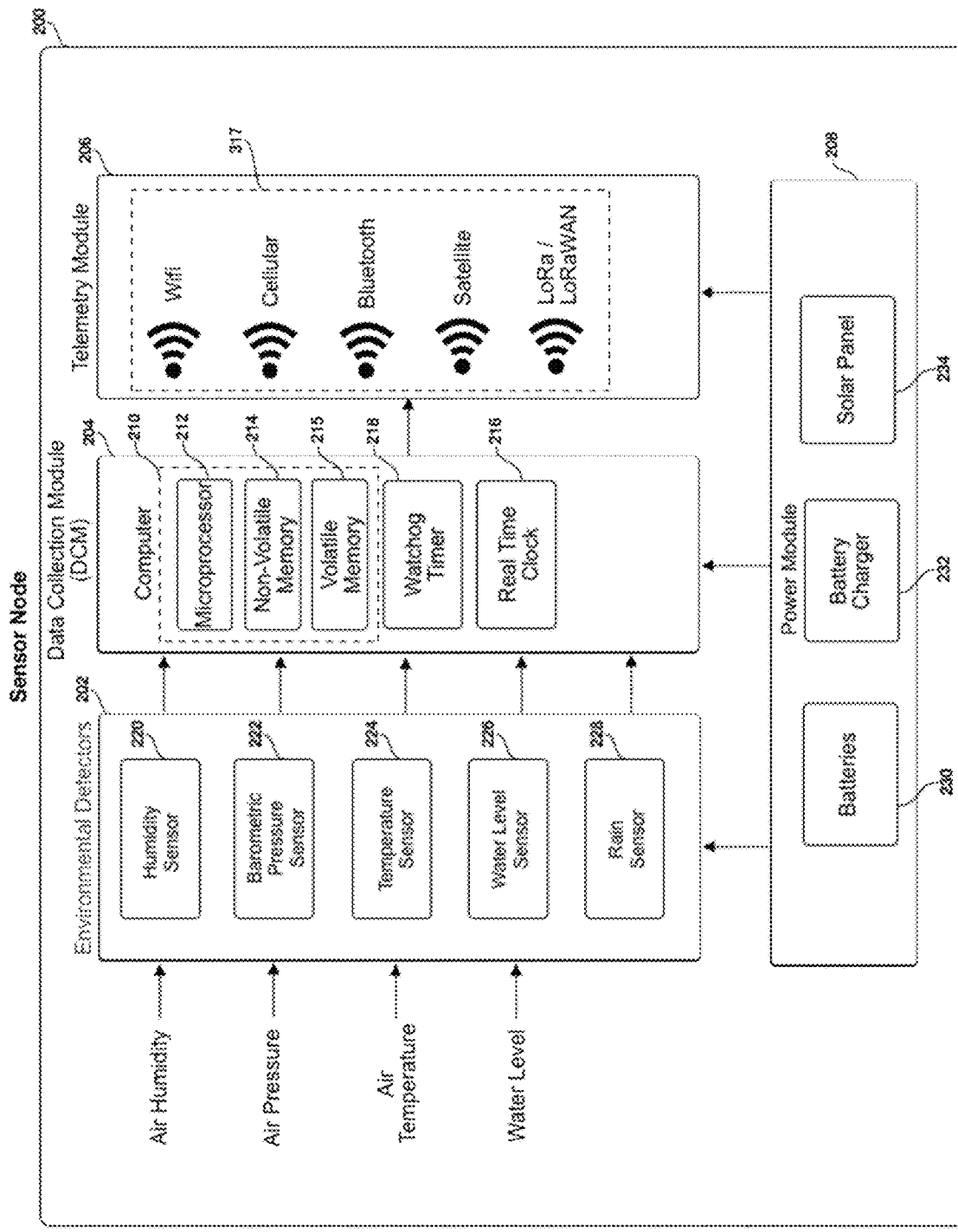
FIG. 2 is a block diagram illustrating an example architecture of a sensor node consistent with certain embodiments of the present invention.

Turning now to FIG. 2, the figure shows a block diagram illustrating an example architecture of a sensor node 200 consistent with certain embodiments of the present invention. The sensor telemetry module 206 is considered the voice of the sensor node 200 and is responsible for operably transmitting sensor node 200 environmental data to the gateway device 300 or the cloud platform 400 via a wireless communication protocol infrastructure 300. The telemetry module 206 may transmit the environmental data to the gateway device 300 or cloud platform 400 by way of various forms of wireless communication protocol infrastructure 236, including transmitting messages via a local Wi-Fi access point, using cellular communications technology such as, but not limited to, LTE, 3G, 4G, and/or 5G, over a low-power wide-area network (LPWAN) such as, but not limited to, LoRa/LoRaWAN or NB-IoT, over a cellular carrier or general packet radio service (GPRS), satellite carrier, or by way of any of a plurality of Near Field Communication (NFC) protocols, such as, by way of non-limiting example, a Bluetooth communication transmission between the sensor node 200 and a mobile device which relays the message to the cloud platform 400 via installed computer/mobile application.

In an embodiment, the telemetry module 206 may be configured to receive sensor node 200 environmental data from the DCM 204 comprised of sensor environmental detector 202 data. Preferably, the sensor node 200 data is transmitted to the cloud platform 400 at predetermined points in time or periodic intervals of time. Ideally, the periodic intervals of time are approximately every six (6) minutes. This frequent periodic rate of transmission ensures timely and accurate data is collected while not overwhelming the communication protocol infrastructure 300, gateway device, ESN 100 and/or the cloud platform 400 with repetitive and redundant data measurements. This frequent periodic rate also aligns with the National Oceanic and Atmospheric Administration (NOAA) standard for environmental reporting.

In this embodiment, periodic intervals of sampling and transmission may be adjusted via the cloud platform 400. In a non-limiting example, during periods of calm environmental conditions (by way of non-limiting example, no rain or rising water level), the sample rate may be decreased, thus reducing the transmission rate. The decrease in sample rate helps to reduce power consumption by reducing transmissions, which may utilize significant power during the transmission period.

The transmission of the data in a periodic interval fashion also serves as a "ping" or "heartbeat" which indicates that the sensor node 200 is still operating and in communication with the cloud platform 400. This approach provides a means of monitoring sensor node 200 health, ensuring that it is still functioning. In a non-limiting example, if an extended period lapses after the last data transmission, such as three times the periodic interval rate, the cloud platform 400 may be configured to determine that the sensor node 200 has failed or has lost communication with the ESN platform and may therefore flag the specific sensor node 200 as non-functional. An automated alert notification message may also be configured to be transmitted by the ESN platform 100 to the cloud platform 400 administrator.

In an embodiment, a power module 208 is provided which delegates and regulates power to all of the sensor node 200 components including environmental detectors 202, telemetry module 206, and Data Collection Module (DCM) 204. The power module 208 provides a power source such as a battery 230 or is wired to an external power source. Ideally, the power source is an array or bank of batteries 230 which may provide electrical power to the sensor node 200. In a non-limiting example, to support the sensor node 200 in a self-contained, autonomous manner, the sensor node 200 may preferably utilize a battery charger 232 connected to a photovoltaic module otherwise known as a solar panel 234. In this non-limiting example, the solar panel 234 may be mounted external to the node sensor 200 and may operate to provide power to the batteries 230 over time by way of the battery charger 232.

Figure 3:
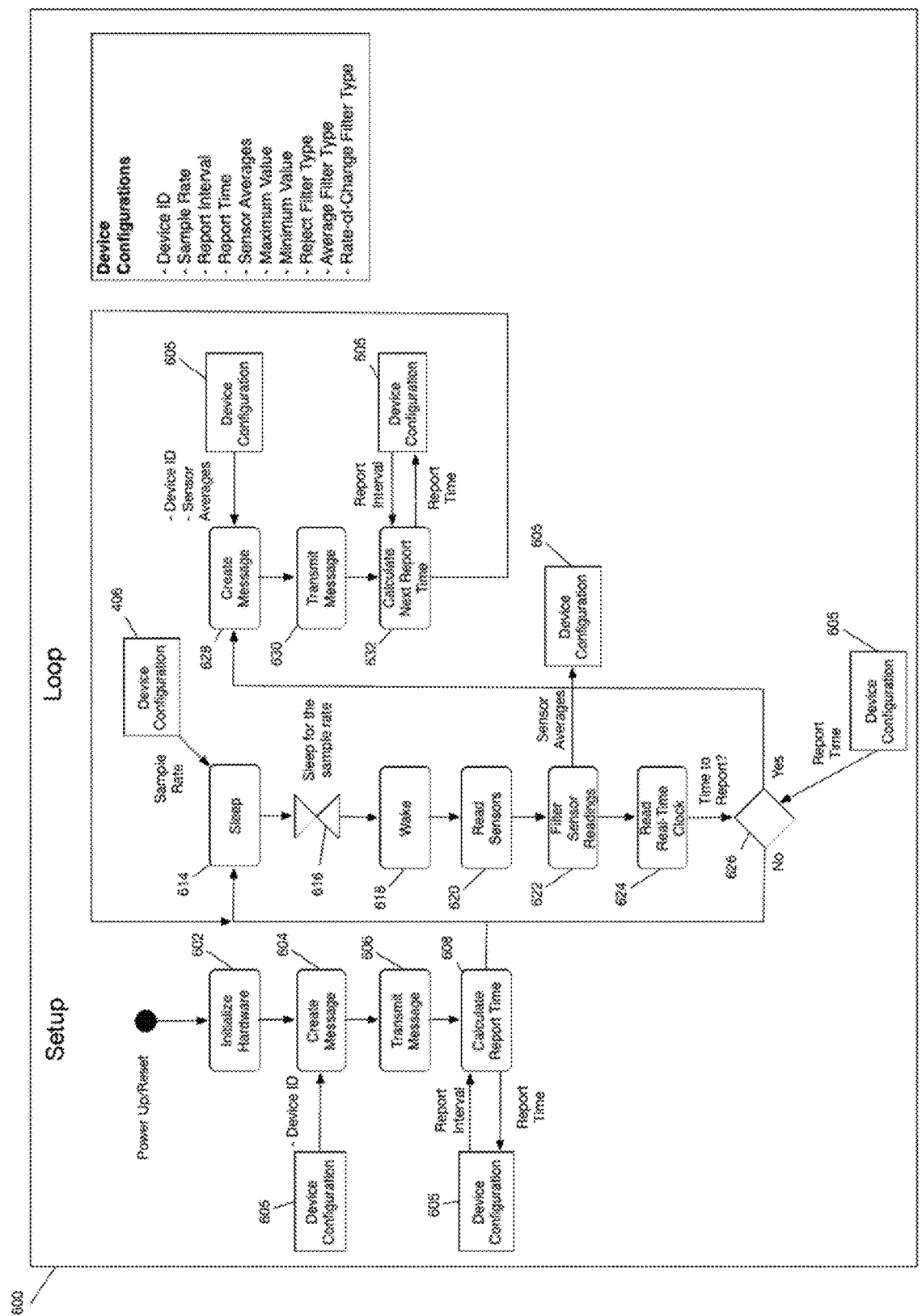
FIG. 3 is a flowchart illustrating an example continuous mode process performed by the sensor node consistent with certain embodiments of the present invention.

Turning now to FIG. 3, the figure shows a flow diagram of a sensor node process for reading and reporting environmental conditions and its surrounding. The disclosed process 600 is classified as continuous mode in that the sensor node 200 reports status continually on a regular interval that is based on the report interval configuration parameter. In an embodiment, the process 600 begins in step 602 by initializing the sensor node 200 hardware. The initialization step 602 includes the configuration of the environmental device interfaces, the sensor telemetry module, the real-time clock, and the watchdog timer. In step 604, the process 600 creates a sensor node 200 message in preparation for transmission. This initial message serves to indicate that the sensor node 200 is functioning properly by sending a message on power-up or sensor node reset.

The message includes the sensor node's unique device ID, the date and time the message was created and each sensor value. Sensor values may include, but are not limited to, distance, rain accumulation, rain intensity, air humidity, barometric pressure battery voltage, battery current, signal strength and air temperature. The message is stored in volatile memory 215. In step 606, the process 600 transmits the sensor node message. The telemetry sensor module 206 is used by the process 600 to broadcast the message via wireless communications. Step 608 calculates a future report time. The report time is based on the configured report interval and is calculated by reading the current time from the real-time clock and calculating a future time that is a multiple of the report interval value. The result of step 608 is stored in volatile memory 215. In step 614 the data collection module computer 210 is placed into sleep mode. The duration of the sleep mode is defined by the sample rate configuration parameter. Placing the DCM 204 computer 210 in sleep mode reduces the power consumption of the computer 210, thus extending battery 230 life. In step 616, the data collection module 204 computer 210 is in sleep mode, for the duration defined by the sample time configuration parameter. In step 618, the DCM 204 computer 210 awakens and continues to process incoming sensor data. In step 620, the DSM 204 reads the environmental data of the environmental detectors 202 included in the sensor node 200. The sensor node 200 may contain multiple sensors to include distance, precipitation, rain accumulation, rain intensity, temperature, battery voltage, battery current, and signal strength All environmental detector/sensor 202 readings are stored in volatile memory 215. In step 622, the environmental detectors 202 readings are smoothed by a filtering algorithm. The filtering algorithm smooths the sensor readings, removing any outlier readings or data spikes. In step 624, the ESN platform reads the DCM real-time clock 216 in preparation for determining when to transmit a sensor message to the cloud platform 400.

In step 626, the ESN platform data processor determines if a sensor message should be transmitted. At step 626 the data processor compares the real-time clock 216 value read in step 624 to the report time configuration parameter. If the time values match, the DCM 204 will begin preparing for message transmission. If the time values do not match, the DCM 204 computer 210 may return to step 614 and begin a sleep cycle. In step 628, the DCM 204 may create a sensor node 200 message in preparation for transmission. The message includes the sensor node 200 unique device ID, the date and time the message was created and each environmental detector value. Sensor values may include, but are not limited to, distance, rain accumulation, rain intensity, air humidity, barometric pressure, battery voltage, battery current, signal strength and temperature. The message is stored in volatile memory 215. In step 630, the telemetry module 206 transmits the sensor node message through a broadcast message transmitted via wireless communications. In step 632 the data processor may calculate a future report time. The report time is based on the configured report interval and is calculated by reading the current time from the real-time clock 216 and calculating a future time that is a multiple of the report interval value. The report time may then be stored in volatile memory 215. At the completion of step 632, the system will return to step 614 and begin a sleep cycle.

Figure 4:
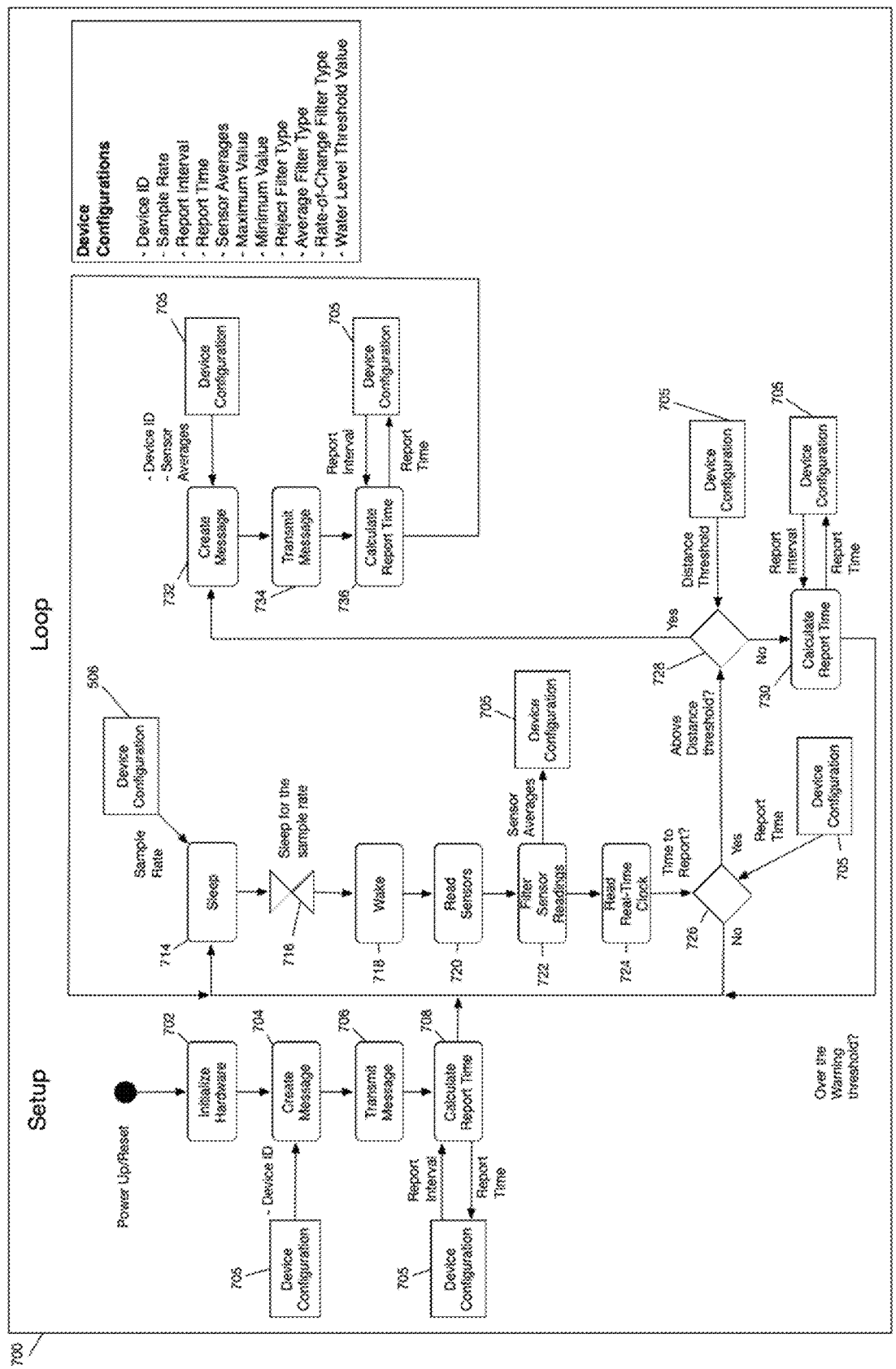
FIG. 4 is a flowchart illustrating an example threshold mode process performed by the sensor node consistent with certain embodiments of the present invention.

Turning now to FIG. 4, the figure shows a flow diagram of a sensor node process for reading and reporting environmental conditions and its surrounding. The sensor node process is initiated by the data processor of the sensor node and is classified as threshold mode in that the sensor node 200 reports status at a reduced report rate and begins transmitting environmental data messages when a threshold value is reached or exceeded.

In an embodiment, the data processor initiates the process at step 702 by initializing the sensor node components and/or hardware. Step 702 includes the configuration of the environmental detectors 202, the sensor telemetry module 206, the real-time clock 216 and the watchdog timer 218. In step 704, the data processor may create a sensor node 200 message in preparation for transmission. This initial message serves to indicate that the sensor node 200 is functioning by sending a message on power-up or sensor node reset.

The message transmitted may include the sensor node 200 unique device ID, the date and time the message was created and values for each environmental detector. The values for the environmental detectors may include, but are not limited to, distance, rain accumulation, rain intensity, air humidity, barometric pressure, battery voltage, battery current, signal strength and temperature. The message is stored in volatile memory 215. In step 706, the data processor transmits the sensor node 200 message.

In this embodiment the sensor telemetry module 206 may broadcast the message via wireless communications. In step 708 the DCM data processor calculates a future report time. The report time is based on the configured report interval and is calculated by reading the current time from the real-time clock 216 and calculating a future time that is a multiple of the report interval value. The result of step 708 is stored in volatile memory 215. In step 714 the data collection module computer 210 is placed into sleep mode. The duration of the sleep mode is defined by the sample time configuration parameter. Placing the DCM 204 computer 210 in sleep mode reduces the power consumption of the computer 210, extending battery 230 life. In step 714 the DCM 204 processor is in sleep mode, the duration defined by the sample rate configuration parameter. In step 718, the DCM 204 processor is awakened by the expiration of the report interval time period. In step 720, the DCM data processor may read the environmental data collected by the environmental detectors 202 included in the sensor node 200. The sensor node 200 may contain multiple sensors to include distance, rain accumulation, rain intensity, temperature, battery voltage and signal strength.

The sensor readings may be stored in volatile memory 215. In step 722, the sensor readings may be smoothed by a filtering algorithm active within the data processor. This algorithm serves to smooth the sensor readings, removing any outlier readings or data spikes. In step 724 the data processor reads the DCM 204 real-time clock 216 in preparation for determining when to transmit a sensor message to the cloud platform 400. In step 726, the data processor determines if a sensor message should be transmitted. Step 726 compares the real-time clock 216 value read in step 724 and compares it to the report interval configuration parameter. If the values match, the DCM 204 data processor may begin preparing for message transmission. In step 726, if the values do not match, the DCM 204 data processor will return to step 714 and begin another sleep cycle. In step 728, the data processor determines if the water level sensor 226 has reached a defined threshold value. This value is a configuration parameter that is set during device setup. If at step 728 the system determines that the distance value has met or exceeds the distance threshold parameter, the data processor will begin preparing to transmit an environmental data message. If, at step 728, the system determines that the distance value is below the distance threshold parameter value, the processor will prepare for another sleep cycle. In step 730, the data processor reads the real-time clock 216 and stores the results in volatile memory 215. The system then returns to step 714 and begins another sleep cycle.

In step 732, the DCM data processor creates a sensor node 200 message in preparation for transmission. The message includes the sensor nodes 200 unique device ID, the date and time the message was created, and each sensor value. Environmental detector values may include, but are not limited to, distance, rain accumulation, rain intensity, air humidity, barometric pressure, battery voltage, signal strength and temperature. The message may be stored in volatile memory 215. In step 734, the data processor transmits the sensor node 200 message. The sensor telemetry module 206 is used in coordination with the data processor to broadcast the message via wireless communications. At step 736 the data processor calculates a future report time. The report time is based on the configured report interval and is calculated by reading the current time from the real-time clock 216 and calculating a future time that is a multiple of the report interval value. The result of step 736 is stored in volatile memory 215. At the completion of step 736, the data processor may return to step 714 and enters another sleep cycle.

Figure 5:
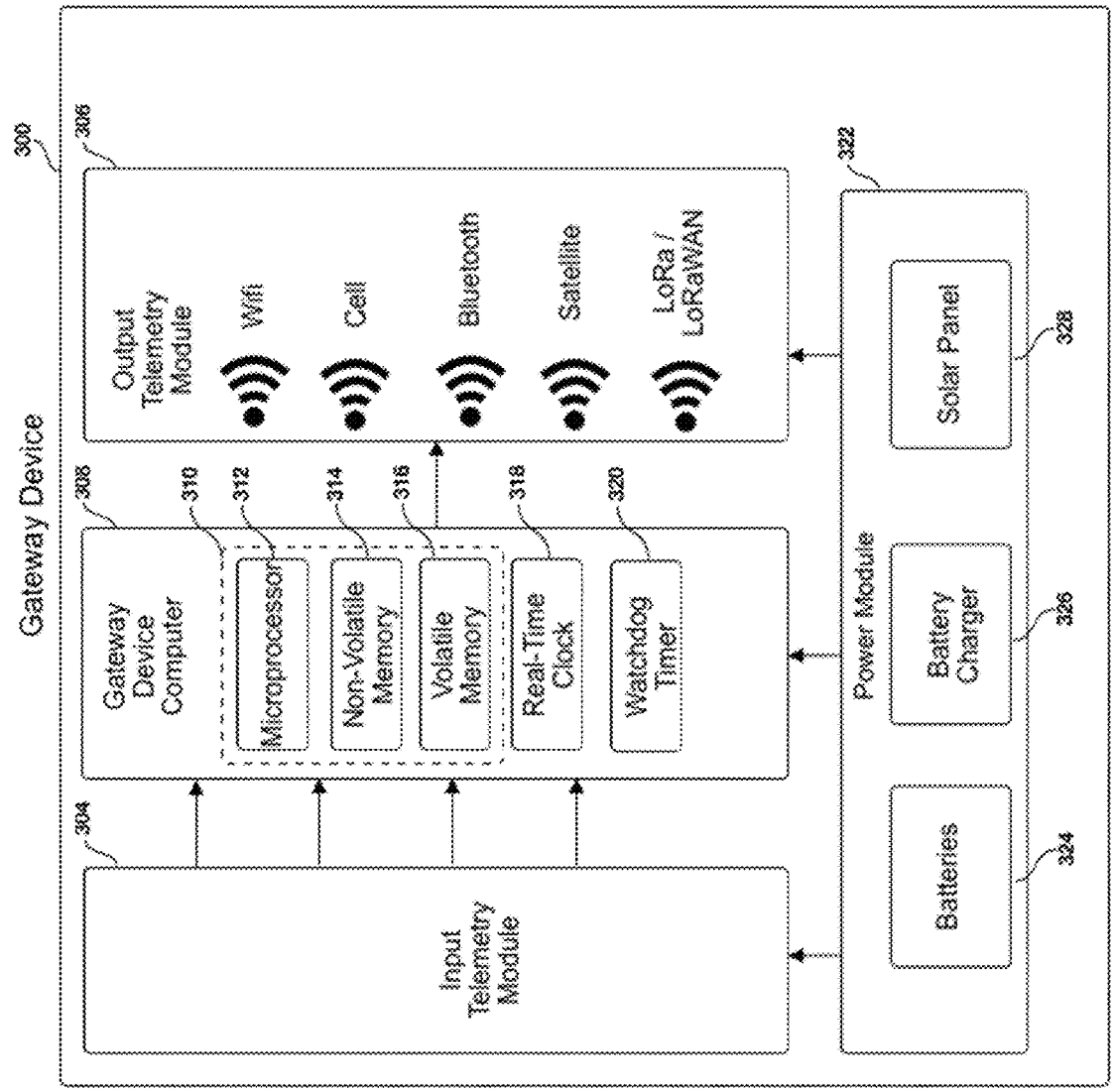
FIG. 5 s a block diagram illustrating an example architecture of a gateway device consistent with certain embodiments of the present invention.

Turning now to FIG. 5, the figure shows a block diagram of a gateway device consistent with certain embodiments of the present invention. In an embodiment, the ESN 100 utilizes a gateway device 300 as means for communicating and transferring messages between the plurality of sensor nodes 200 and the cloud platform 400. The gateway device 300 is configured as a portal between the sensor node 200 and the cloud platform 400, allowing them to share information and messages by communicating between protocols. In an exemplary embodiment, the gateway device 300 receives data in the form of messages from the sensor node 200, aggregates the data and then transmits the data to the cloud platform 400.

In an embodiment, the gateway device 300 generally comprises an input telemetry module 304, an output telemetry module 306, and a gateway data collection module ("GDCM") 308 for providing computer logic for the operation of the gateway device 300. The input telemetry module 304 is operably configured to receive data from the sensor telemetry module 206. The input telemetry module 304 may be utilized by the gateway device 300 to wirelessly receive environmental data from a plurality of sensor nodes 200. In an exemplary embodiment, the input telemetry module 304 comprises a LoRa/LoRaWAN receiver/concentrator which is configured to provide a communication link to and from the sensor nodes 200. The LoRa/LoRaWAN receiver is configured to provide a local, secure network between the sensor nodes 200 and the input telemetry module 304. In a non-limiting example, all communications in the form of message transmissions are encrypted using Advanced Encryption Standard 128 (AES 128) which encompasses the process of encoding a message or information in such a way that only authorized parties may access the contents of the message transmissions.

In an embodiment, the gateway device computer 310 may be configured to provide processing power which manages multiple communication channels between one or more sensor nodes 200 and the cloud platform 400. The gateway device 300 may be configured to support secure communication between the sensor nodes 200 and the cloud platform 400. In a non-limiting example, support for SSL/TLS via HTTP(s) or MQTT(s) protocols and may be enabled to support secure communications between the gateway and the cloud platform.

In an embodiment, the output telemetry module 306 is responsible for receiving and transmitting communications between the gateway device 300 and the cloud platform 400. The output telemetry module 306 is responsible for operably transmitting sensor device gateway 300 environmental data to the cloud platform 400. The output telemetry module 306 may transmit the environmental data to the cloud platform 400 by way of various forms of wired and wireless communication protocol infrastructure, including transmitting messages via ethernet, a local Wi-Fi access point, over a low-power wide-area network (LPWAN) such as, but not limited to, LoRa/LoRaWAN or NB-IoT, over a cellular carrier, satellite carrier, or by way of a Near Field Communication (NFC) protocol such as, but not limited to, Bluetooth.

In an embodiment, the gateway data collection module (GDCM) 308 may comprise a computer 310 having a microprocessor 312 and a non-volatile electronic memory 314 that may be connected to one or more programmable input/output peripherals. The microprocessor 312 may be encoded with computer software modules containing instructions/computer programs for operation command and control, as well as a volatile memory element 316 in which environmental data may be stored in the event of the loss of communications with the GDCM.

In an embodiment, the GDCM may comprise one or more software modules containing executable instructions for the creation and instantiation of a gateway device 300 application. The gateway device application further comprises a software module configured to receive the environmental data via the input telemetry, a software module configured to apply an algorithm to the environmental data to parse, add data such as but not limited to current date and gateway ID, and clean and aggregate environment data, and a software module configured to wirelessly transmit the environmental data via the output telemetry.

In this embodiment, the gateway device software modules executed by the embedded microprocessor 312 may be configured to execute a plurality of components of the device's processes, such as, in non-limiting examples, lightweight threads of execution. These threads of execution may be executed as a sequence of programmed instructions that can be managed independently by a scheduler. In this embodiment, each thread may be configured to manage a specific gateway device communication channel. A central process may manage thread communications, passing commands and receiving messages as required to support end-to-end processing.

In an embodiment, the gateway data collection module 308 may contain a real-time clock 318 that supports the gateway data collection module 308 with the reporting/transmitting of environmental data at defined time intervals or at a given point in time. In a non-limiting example, the GDCM 308 may report environmental data at specific time points, such as, in a non-limiting example, at 6-minute intervals, sixty-minute intervals, or any other user-defined time interval. The GDCM 308 may contain a watchdog timer 320 that may reset the GDCM 308 in the event of a loss of communications or failure of the GDCM.

In an embodiment, the gateway device 300 comprises a power module 322 which delegates and regulates power to all of the gateway device 300 modules and components. The power module 322 comprises a power source such as a battery 324 or may incorporate a connection to an external power source. To support the gateway device 300 in a self-contained, autonomous manner, the gateway device 300 may utilize a battery charger 326 operably connected to a photovoltaic module such as a solar panel 328. The solar panel 328 may be mounted exterior to the gateway device 300 and will operate to provide power to the batteries 324 by way of the battery charger 326 over a period of time.

Figure 6:
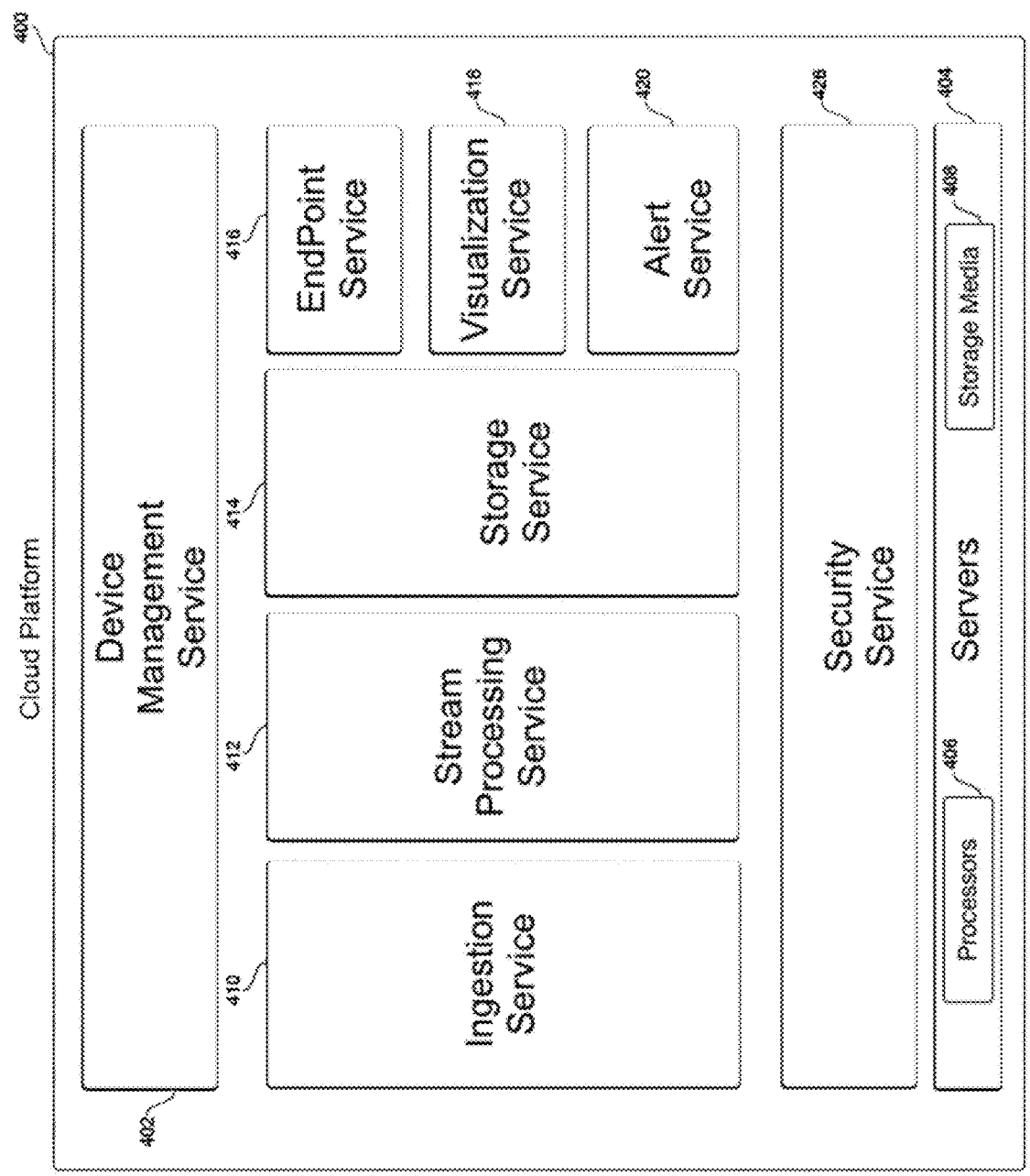
FIG. 6 is a block diagram illustrating the major services of the cloud platform consistent with certain embodiments of the present invention.

Turning now to FIG. 6, the figure shows a detailed view of the cloud platform 400 consistent with certain embodiments of the present invention. In an embodiment, the cloud platform, configured as a portion of the ESN platform 100, may consist of a device management service 402, ingestion service 410, streaming processing services 412, storage service 414, endpoint service 416, visualization service 418, alert service 420, and security service 426. The ESN 100 cloud platform 400 is configured as a backend as a service (BaaS) system element, which is designed to support real-time stream processing of sensor node 200 environmental data. Generally, the cloud platform 400 utilizes multiple services to provide device management, ingestion, transformation, analytics, storage, and visualization of the environmental data collected by the plurality of sensor nodes 200.

In an embodiment, the cloud platform 400 may be configured to provide 24 hour/7 day a week real-time access to the plurality of sensor node environmental data stored within an electronic storage medium within the cloud platform 400. The sensor node 200 environmental data may be viewed in real time or in some form of visualization report to identify trends.

In an embodiment, stream processing services 412 may be performed within the cloud platform 400 to efficiently generate real-time automated alert notifications, which may then be transmitted to a consumer device 500. In a non-limiting example, alert notifications may be transmitted via text message or application notification to a smartphone device, cellular device, tablet, smart watch and/or external computer system or via social media or by email, when specified water-level parameters exceed predefined thresholds.

In an embodiment, the cloud platform 400 comprises a device management services module 402 which generally includes one or more cloud servers 404 comprising a processor 406 and electronic computer readable storage media 408 encoded with one or more computer software modules including instructions to create a server application. The server application may comprise a software module configured to receive the environmental data, a software module configured to apply an algorithm to the environmental data to determine an environmental trend or condition, a software module configured to store the environmental data, a software module configured to generate an environmental data report comprising of an environmental trend or condition, as well as other service-related software modules. In a non-limiting example, the environmental data report may comprise information related to rainfall water level conditions, trending water levels, water surge conditions, and regional graphical trends. This environmental data report may be transmitted by the server application to an external consumer device 500 and transmit data reports and environmental data when certain parameters exceed predefined thresholds in the form of one or more emergency alerts.

In an embodiment, environmental data may be obtained from a plurality of sources and in many different formats. Sensor node messages may arrive at the cloud platform directly from a sensor node, passed through a wireless carrier, or may comprise supporting data imported from one or more external systems. The ESN platform 100 supports the importing and processing of information from multiple data sources to properly monitor and report flood conditions to external users.

Figure 7:
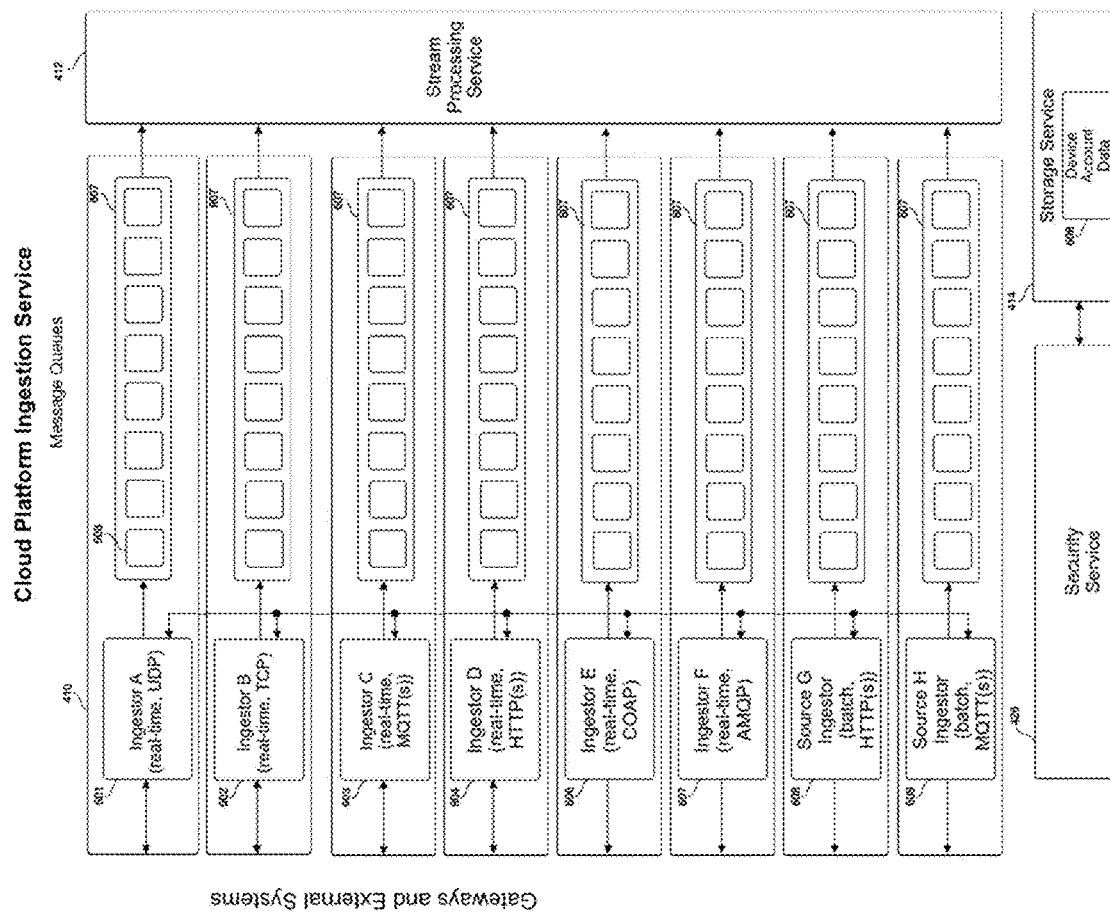
FIG. 7 is a block diagram illustrating an example cloud platform ingestion service consistent with certain embodiments of the present invention.

Turning now to FIG. 7, the figure presents a view of the cloud platform import of environmental data messages consistent with certain embodiments of the present invention. In an embodiment, the cloud platform may comprise an ingestion service 410 that imports environmental data messages from multiple sources into the cloud platform. The ingestion service 410 supports both real-time and batch import of environmental data messages. The ingestion service 410 receives sensor node environmental data messages, via a gateway 300 or external data source. The ingestion service 410 may then place these messages into one or more message queues 436 in preparation for real-time processing by the stream processing service 412.

In an embodiment, the ingestion service 410 may contain multiple data pipelines with each pipeline comprised of a single ingestor and a single message queue. There is a one-to-one relationship between an ingestor and a message queue. Each pipeline handles messages for a given data source and a given data format. The ingestor is responsible for handling communications between the external data source and the cloud platform 400. The type of ingestor is dictated by the data format of the incoming message and the source communications protocol. In a non-limiting example, if the external data source communicates via TCP, the ingestor is configured to support the TCP protocol 428. Ingestor communications protocols may include UDP 427, TCP 428, HTTP 430, HTTP(s) 430, MQTT(s) 429, COAP 431, and AMQP 432.

In an embodiment, prior to importing a message, the external data source must authenticate with the cloud platform 400. The authentication process is handled by the ingestor. External data sources may send authentication data to the ingestor. The data may arrive in the form of a username and password or an authentication key. The ingestor receives the authentication data and passes the authentication data to the security service 426 for authentication. The security service 426 compares the authentication data to the device authentication data stored in the storage service 414. If the two data sources match, the security service approves the external data source request for access.

In an embodiment, upon successful authentication, the ingestor may accept environmental data messages. As messages are received by the ingestor, they are placed into an associated message queue 436. Messages 435 are not modified by the ingestor. In this embodiment, the message queue 436 may act as a temporary storage location for the messages 435 as well as a rate matching buffer for the stream processing service 412. If the message data volume exceeds the number of messages the stream processing service can successfully process, the message queue 436 may buffer the messages 435 until the stream processing service is once again available to process message data. Environmental data messages 435 remain in the message queue 436 until the environmental data message is extracted by one or more stream processing 412 pipelines.

In an embodiment, when in batch import mode, the ingestor may access message data from an external data source. In real-time mode the ingestor receives messages 435 via push requests. However, in batch mode, the ingestor extracts message and other data from an external data source through one or more pull requests. Batch-mode ingestors may execute a pull request for data at regularly scheduled time intervals or may execute a pull request on command by the user. The schedule for the ingestor may be configured prior to the start of the data ingestion process. In batch mode, an extractor may receive a packet of data that may contain multiple environmental data messages 435. The ingestor may split the packet contents into individual messages 435 that may then be placed into the appropriate message queue 436. Environmental data messages will be processed in a similar fashion to the real-time pipeline processing upon placement in a message queue 436.

Figure 8:
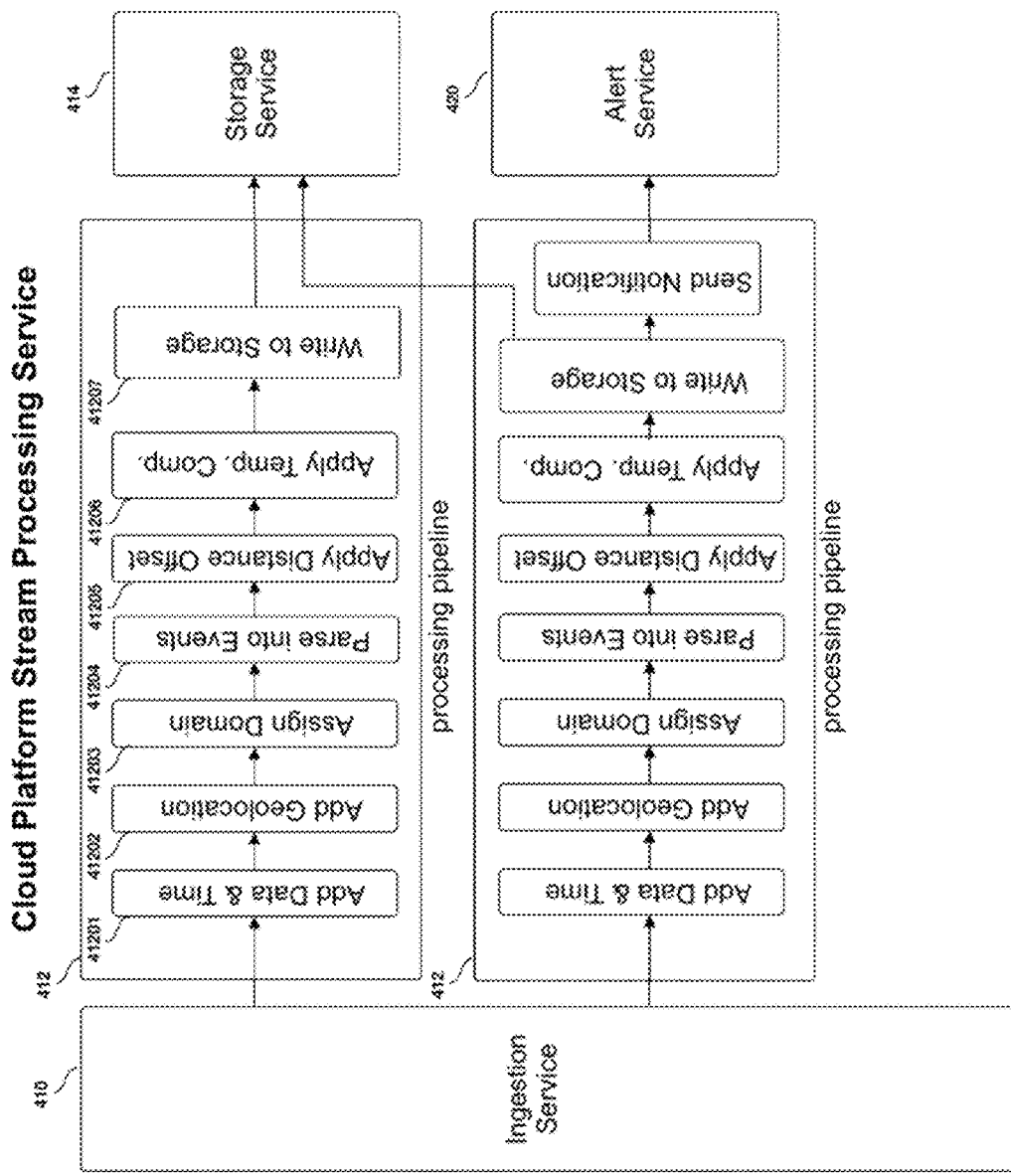
FIG. 8 is a block diagram illustrating an example cloud platform stream processing service consistent with certain embodiments of the present invention.

Turning now to FIG. 8, the figure presents a view of the cloud platform stream processing service whose configuration is consistent with certain embodiments of the present invention. In an embodiment, the cloud platform 400 may be configured to support real-time processing of sensor node environmental data. In this embodiment, the cloud platform 400 may comprise one or more servers 404 comprising a processor 406 and readable electronic storage media 408 encoded with a plurality of software modules that may be tailored to process and apply algorithms to the sensor node 200 messages. In a non-limiting example, after sensor node messages pass through the ingestion service 410, they are extracted from the ingestion service message queues for processing by the stream processing service 412.

In an embodiment, a stream processing service 412 is configured to normalize the environmental data received from each sensor. The normalizing process comprises at least removing erroneous data, removing outlier data, flagging erroneous data, interpolating missing data, flagging outlier data, applying temperature compensation 442 and/or applying a distance offset 441. A software module may be configured to apply an algorithm to the environmental data to generate pre-analytic data. The pre-analytic data may comprise events and conditions to which each sensor was subjected. In a non-limiting example, the pre-analytic data comprises water level dynamics comprising one or more of: water level increase, water level decrease, rate of water level change at each sensor node.

In an embodiment, a software module may be configured to apply an algorithm to a set of pre-analytic data to generate analytic data, the analytic data comprising trends of a plurality of events, correlations of a plurality of events, trends of a plurality of conditions, correlations of a plurality of conditions. In a non-limiting example, the analytic data may comprise: water level condition, water level rate of change over time, water level heights compared to historic potential, ranking of water level height compared with other sensor locations within a geographical region, tidal movement, rain intensity, rain accumulation or flooding.

In an embodiment, the stream processing service 412 may be made up of multiple processing pipelines with each pipeline including a connected set of single purpose software functions that process, transform and undertake analytic tasks on the environmental data messages in real time. In a non-limiting example, a stream processor service pipeline may be configured to listen only for a special type of message, while another may perform complex message processing in parallel. At least one stream processing pipeline is associated with an ingestion pipeline. The processing pipeline extracts messages from an ingestion message queue 436 and begins this process.

In an embodiment, the following are a list of tasks, functions, and data flows for the stream processing service application pipeline functions:

a. Raw Data Message Storage 443. The simplest task is reading device messages from the ingestion service 410 and passing them to the storage service 414, saving it to the computer readable storage medium 408. This data can be used as an archive for raw device data as well as for batch analytics.

b. Transforming messages. Sensor node 200 message data is transformed to another format, by way of non-limiting example, converting raw water-level data to a calibrated unit measure of distance 441.

c. Aggregating data and computing. Sensor data can be combined to add checks, such as, but not limited to, averaging data across multiple devices to avoid acting on a single, spurious, device, ensuring that there is actionable data if a single device goes offline. By adding computation to the pipeline, streaming analytics can be performed on the data while it is still in the processing pipeline.

d. Enriching data. Water-level data can be combined with additional environmental data, for use in subsequent analysis. In a non-limiting example, water level distance data can be adjusted due to fluctuations in temperature 442.

e. Device state. In addition to processing the raw message data, the stream processor can update the "last known value" of sensor nodes. Specific aggregated or pre-calculated values can also be stored in the sensor node registry for easy access by cloud platform services, as needed.

f. Sensor node metadata. In some cases, sensor nodes may send messages indicating changes of their metadata attributes. Typically, those are separated from the general telemetry stream. An event processor can "listen" for those messages and update the device registry as appropriate. An example is a change in configuration for the sensor node.

g. Analytics. A complex event processing function can analyze ingested messages in (near) real time, comparing multiple real-time streams or comparing real-time streams with historical values and models. This enables the detection of anomalies, recognition of patterns over rolling time windows, and the ability to trigger an alert when a specific condition appears in the stream. Notification Service 444 are forwarded to the alert service to be handled according to business rules, or can initiate an integration workflow with line-of-business systems directly.

h. Advanced analytics and machine learning. Incoming events can be forwarded to specialized modules for advanced analytics and machine learning. Those can perform large-scale, in-motion analysis and visualizations.

In an embodiment, at minimum, the ESN 100, the stream processing service algorithms may focus on the injection and storage of raw sensor node 200 data and the monitoring of the data for threshold values or environmental conditions. When a threshold value is found, the stream processing service 412 may generate alert messages 444 to all registered persons.

Figure 9:
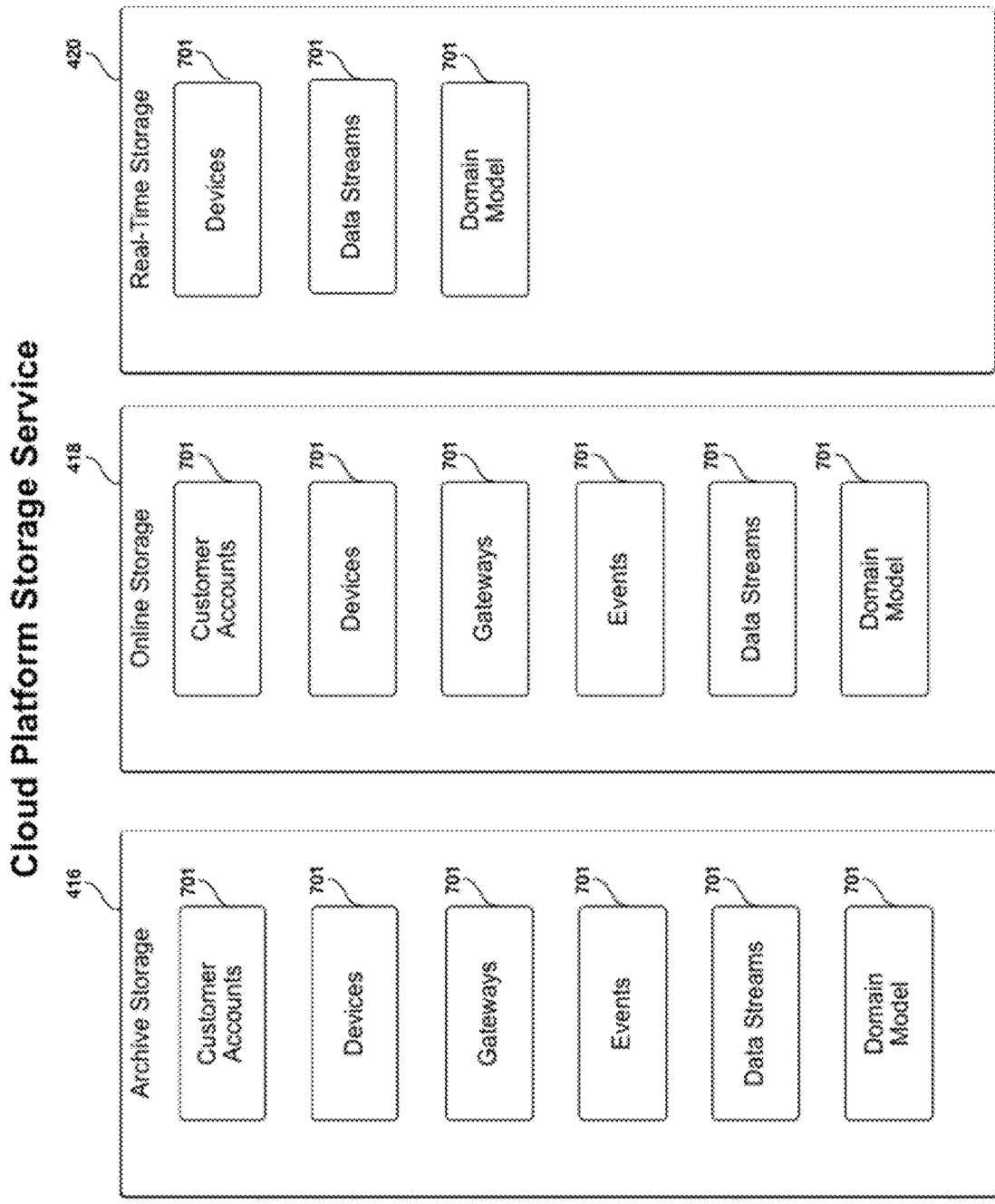
FIG. 9 is a block diagram illustrating an example cloud platform storage service consistent with certain embodiments of the present invention.

Turning now to FIG. 9, the figure shows a view of a cloud storage service consistent with certain embodiments of the present invention. In an embodiment, the cloud platform 400 may comprise a storage service 414 which is configured to store messages and supporting data on one or more computer readable storage media 408 received by the ingestion service 410 and processed by the stream processing service 412. In an embodiment, the storage service 414 replicates its data to one or more computer readable media 408 at one or more locations so as to ensure high-speed access to the data from any location. Moreover, providing one or more computer readable media 408 at one or more locations ensures that the sensor node 200 and other data is continuously duplicated and thus backed up. The storage service 414 is configured to enable access of the stored data on the one or more computer readable media 408 by system applications and software modules. However, preferably systems applications and external applications will access ESN 100 messages via storage service 414 queries and REST APIs.

In an embodiment, the storage service 414 provides short-term and long-term storage of environmental data messages and supporting data. The storage service 414 is composed of three forms of data storage, namely, archive storage 445, online storage 446 and real-time storage 447.

Archive storage 445 provides long-term storage for data messages and supporting data. Archive data sets may include data for customer accounts 448, devices 449, gateways 450, environmental events 451, data streams 452 and customer domain models 453. Archive storage 445 provides support for tasks that do not require real-time access or fast response queries such as, by way of non-limiting example, data analysis and data visualization. Data in archive storage has an unlimited lifespan.

Online storage 446 provides mid-term storage for use by online processes. Online processes include endpoint service 416 APIs and the device management tools. Data in online storage will have a limited lifetime with the online storage holding no more than one year's worth of data.

Real-time storage 447 supports the reporting of environmental data in real time. Stream processing pipelines deposit messages into the real-time data storage streams. External clients 500 such as, by way of non-limiting example, smartphones 503, tablets 503, desktop applications 503, external devices 505 and external systems 505 register with a given stream for real-time updates. The endpoint service 416 forwards data stream messages to all registered clients 500.

Figure 10:
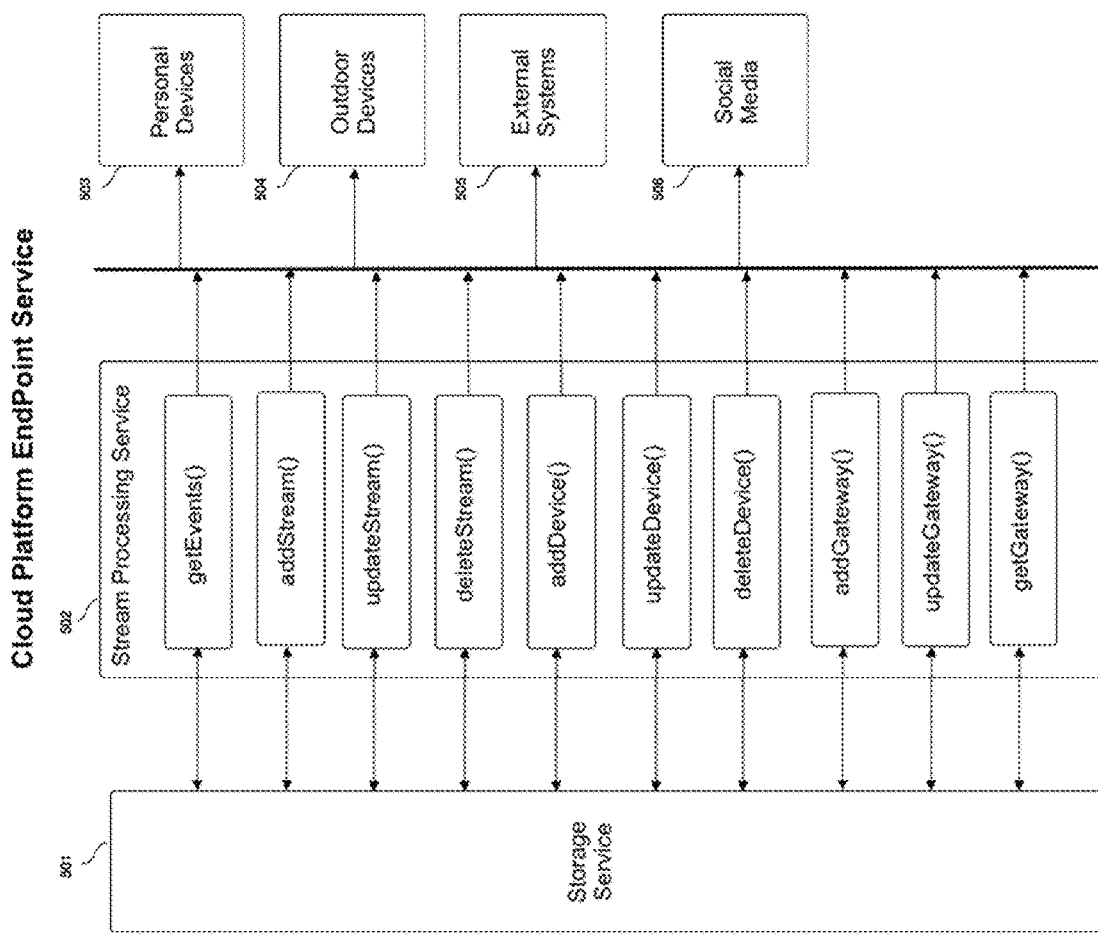
FIG. 10 is a block diagram illustrating an example cloud platform endpoint service consistent with certain embodiments of the present invention.

Turning now to FIG. 10, the figure shows a view of the cloud platform endpoint service consistent with certain embodiments of the present invention. In an embodiment, the endpoint service 418 provides access to cloud platform 400 data for consumer devices 500. Consumer devices 500 include outdoor devices 504, personal devices 503, external systems 505 and social media 506 sites. The endpoint service 418 is configured to execute and run software modules designed to manage data stream processing and the access of water level and environmental data. External consumer devices 500 provide an external consumer device processor configured to receive and display either environmental data reports or the alert notifications.

The cloud platform 400 endpoint service 418 module is configured to execute and run software modules designed to manage data stream processing and the access of water level and environmental data.

Cloud platform 400 data access can be either batch mode or real-time. For batch mode, the endpoint service 418 exposes REST APIs for external clients 500 to access environmental data messages and supporting data.

Consumer devices 500 must successfully authenticate prior to accessing cloud platform 400 data. The endpoint service 418 manages the authentication process in cooperation with the security service 426. Clients 500 include an authentication key in the header of the API request. If the authentication key is associated with a valid account, the endpoint service 418 executes the API request. If the authentication key is invalid, an error message is returned to the client indicating that access has been denied. Once authenticated, the endpoint service 418 processes the API request and returns a dataset whose contents are based on the API request query parameters. The endpoint service 418 accesses data for API requests from the storage service 414 online storage.

In real-time mode, the endpoint service 418 provides cloud platform 400 data via real-time pushes to registered clients 500. External clients 500 must first register for a given data stream. Similar to batch mode, clients 500 must provide an authentication key as part of the registration process. If successfully authenticated, a real-time data pipeline, in the form of a websocket, is established between the client 500 and the cloud platform 400. The endpoint service 418 will push stream data to all registered clients 500 in real time as it is received. The cloud platform 400 may be configured to provide an application that comprises a software module which is configured to apply an algorithm to the environmental data to determine an environmental trend or condition and/or a software module which is configured to transmit the environmental data report when certain parameters exceed predefined thresholds.

In an embodiment, the cloud platform 400 may include an alert service 420 that acts as a broadcast service to send alert messages to the general public. Messages are broadcast to outdoor devices 504, personal devices 503, external systems 505 and social media 506. When the stream processing service 412 determines that a sensor node's 200 water level has exceeded a defined threshold, the service may send a publish request to the alert service 420. The request contains a severity level, message content and optionally an image and geolocation data. The alert service 420 may format the message to meet the needs of the data feeds, and then publish the message. For outdoor devices 504 such as but not limited to roadway signs or cross gates, the alert message may be structured in a format, such as, but not limited to, JSON, that can easily be read and processed by the device. For personal devices such as, but not limited to, desktop, smartphones or tablets, alert messages are in the form of in-app alert notifications. This form of alert is only available to clients who install the accompanying application.

The alert service 420 may post alert messages to multiple social media sites. In a non-limiting example, alert messages can be posted to Facebook, Twitter, Instagram, LinkedIn, WhatsApp, Waze or any other specified social media service provider. In each form of social media, the alert may contain a text message and/or an image of the flooded area, and may include pertinent information such as, but not limited to, rain intensity, rain accumulation, and/or the depth of standing or flowing water with respect to depth over time based upon the contribution of rain intensity and/or rain accumulation. The cloud platform 400 and environmental sensor network 100 authorization and authentication is based on per-device identities and access credentials and permissions that maybe revoked in case of sensor node 200 misuse.

In an embodiment, sensor node 200 data messages transmitted to the gateway device 300 are preferably encrypted using the AES 128 encryption scheme. Data messages transmitted from the gateway 300 to the cloud platform 400 will be encrypted to support transmission to the cloud platform 400. Upon bootup, the gateway devices 300 may be configured to be first authenticated by the cloud platform 400 before the gateway device 300 will be authorized to exchange data with the cloud platform 400. Preferably, all data flowing through the cloud platform 400 will follow an at-rest, in-motion encryption scheme.

For sensor nodes 200 and gateways 300 that connect directly to the cloud platform 400, the ingestion service 410 utilizes the security service 426 to authenticate the devices. These devices are required to authenticate prior to data transmission. If authorization is not granted, the ingestion service 410 will reject any incoming messages from the unauthorized device. Device authorization is based on a username and password or authentication key. Both forms are provided to the device administrator for inclusion in the device configuration parameters.

For customers utilizing the network management portal, the security service 426 authenticates the customer during the login process. Customers must login to the ESN platform prior to accessing and managing their portion on the ESN network 100. Customers are provided a username and password for use during login. During the login process, the username and password are passed to the security service 426 for authentication. If the username and password match a registered customer account, the client is granted access to the portal. If the username and password do not match a registered customer account, the security service denies access and an error message is reported to the client.

For customers who desire to access the cloud platform 400 data via a RESTful API interface, the security service 426 will authenticate the API request prior to returning a dataset. The API request contains an authentication key in the header of the request. If the key matches a valid customer account, access is granted, and the API request is processed. If the key is invalid, access is denied and the endpoint service 418 returns an error message.

In an embodiment, the cloud platform 400 may comprise a device management service 402. The device management service 402 manages all aspects of the ESN 100 to include sensor node 200 and gateway 300 setup and management, stream management and account management. The device management service 402 includes a web-based portal or personal device 503, by way of non-limiting example, a smartphone or tablet, application for internal staff and external customers to manage the network. The device management service 402 handles the device inventory the ESN 100.

Senor nodes 200 and gateways 300 are configured, and their state managed, through the device management service 402. Configuration includes the addition of a device on the network 100, the update of device data, the de-activation of a device and the assignment of a device to a data stream. In the case of device de-activation, the device's storage record is marked inactive. The record is not removed from storage;

it remains there for historical purposes. The device management service 402 also stores the device or gateway 300 state. A device state contains the last known message from the device. Device state is used to quickly determine the condition of the device and can be used if there is a time gap in reporting.

In an embodiment, streams are configured through the device management service 402. Configuration includes the creation of a data stream, the update of stream metadata, the de-activation of a stream and the assignment of a device to a stream. The device management service 402 sends a request to the storage service 414 to create or update a stream. Streams reside in real-time storage in the storage service 414.

Accounts are managed through the device management service 402. The ESN 100 supports device and customer accounts. Device accounts are utilized by sensor nodes 200 and gateways 300 to authenticate through the ingestion service 410. Customer accounts are used to authenticate through the device management portal or the endpoint service's 418 API interface. The device management service 402 utilizes the storage service 414 to store device and customer accounts.

In an embodiment, the data stream architecture provides for the flow of data through a network. As environmental data messages are received and recorded by the cloud platform 400, the route of an environmental data message may vary. Stream processing is composed of multiple processing flows that work together to define and shape the data stream, transforming messages to produce different types of output. Data streams terminate and emerge in different parts of the ESN 100, based on the type of data processing that occurs. This intermediate processing may be performed "on the fly" as part of stream processing.

Figure 11:
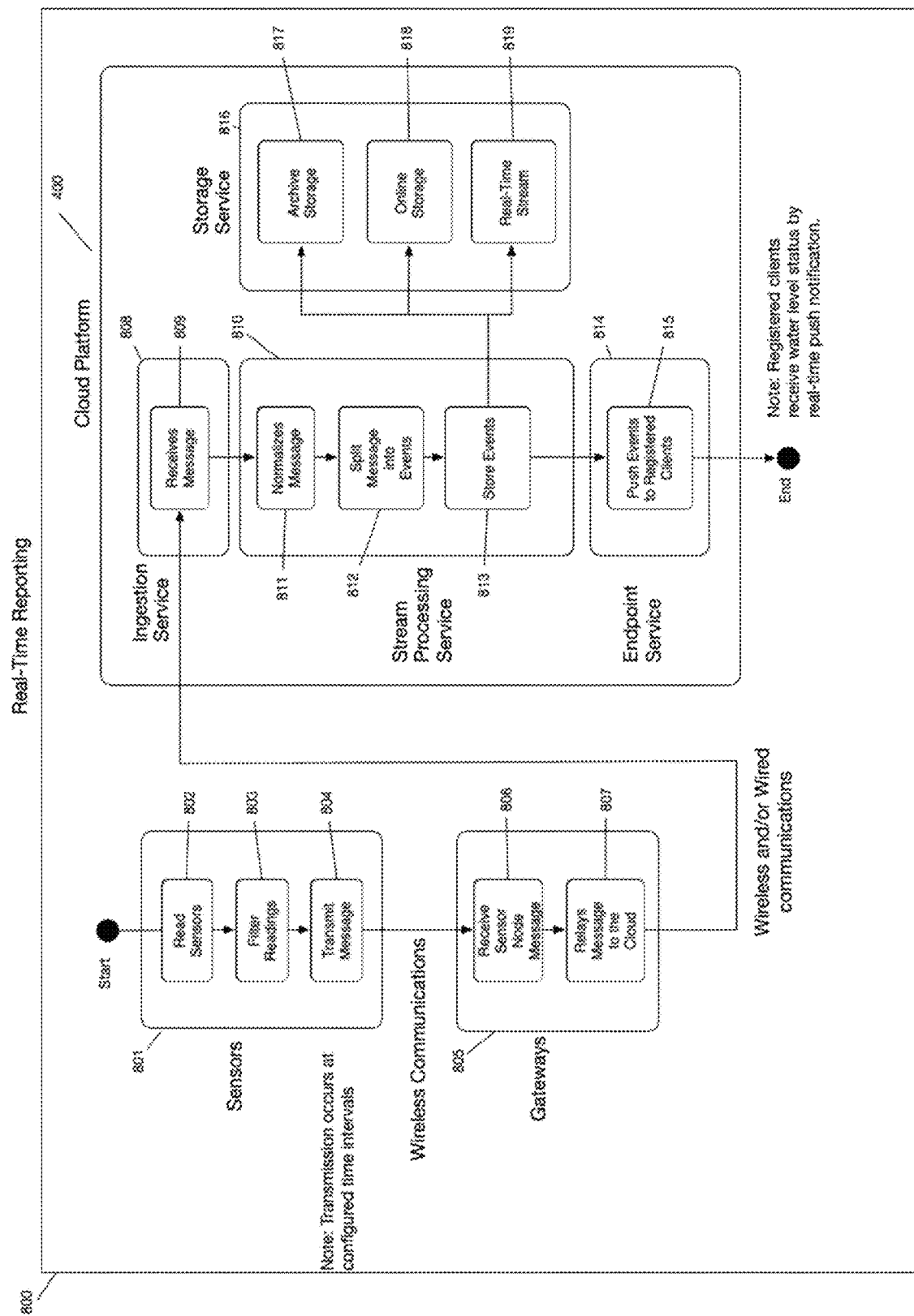
FIG. 11 is a flowchart illustrating an example real-time reporting process performed by an example environmental sensor network consistent with certain embodiments of the present invention.

Turning now to FIG. 11, the figure shows a flow diagram for reading and reporting environmental conditions in real time consistent with certain embodiments of the present invention. In an embodiment, an ESN Process 800 is classified as real-time reporting mode, in that the sensor node 200 reports status at a continuous interval. Process 800 begins with step 802 by reading the sensor node 200 values. In step 802, the sensor node 200 averages the sensor readings to remove data spikes and to smooth output. In step 804, the sensor node 200 transmits a message that includes the sensor node 200 unique ID, a timestamp and sensor node 200 readings. The message is transmitted to one or more gateways 300 via a wireless communications protocol.

In step 806, a gateway 300 receives the sensor node 200 message. In step 807, the gateway 300 relays the message to the cloud platform 400 via wireless or wired communications. In a version, the gateway 300 may append, or "wrapper", the sensor node 200 message with additional data. The gateway 300 may append data items such as, but not limited to, the gateway ID and a timestamp. The timestamp indicates the date and time the sensor node 200 message was received by the gateway 300.

In step 809, the ingestion service 410 receives the sensor node 200 message, importing it into the cloud platform 400. The ingestion service 410 places the message into a message queue, where it is retrieved by one or more stream processing pipelines. In step 811, the stream processing service 412 normalizes the message by adding a timestamp and geolocation data and assigning the message to a customer domain. In a version, the message may already contain timestamp and geolocation data. In this case, the stream processing service 412 will make no changes to the message. In step 812, the stream processing service 412 splits the message into discrete environmental events. A message may contain multiple sensor node 200 readings. Step 812 separates these sensor node 200 readings into individual event records, with each record containing a single sensor node 200 reading. Each event record will contain the timestamp, geolocation, and assigned domain or the original message.

In Step 813, the stream processing service 412 stores the event records via the storage service 414. Each event record is written to archive storage 416, online storage 418, and a real-time stream 412. Once event storage is complete, step 816 pushes the event records to registered clients 500 in real time. Registered clients 500 include outdoor devices 504 such as, but not limited to, variable message signs, barriers, flood pumps or flood gates, desktop applications or external customer systems 505 such as, but not limited to, GIS (Geographic Information Systems), emergency management systems, weather service systems, and/or traffic management systems.

Figure 12:
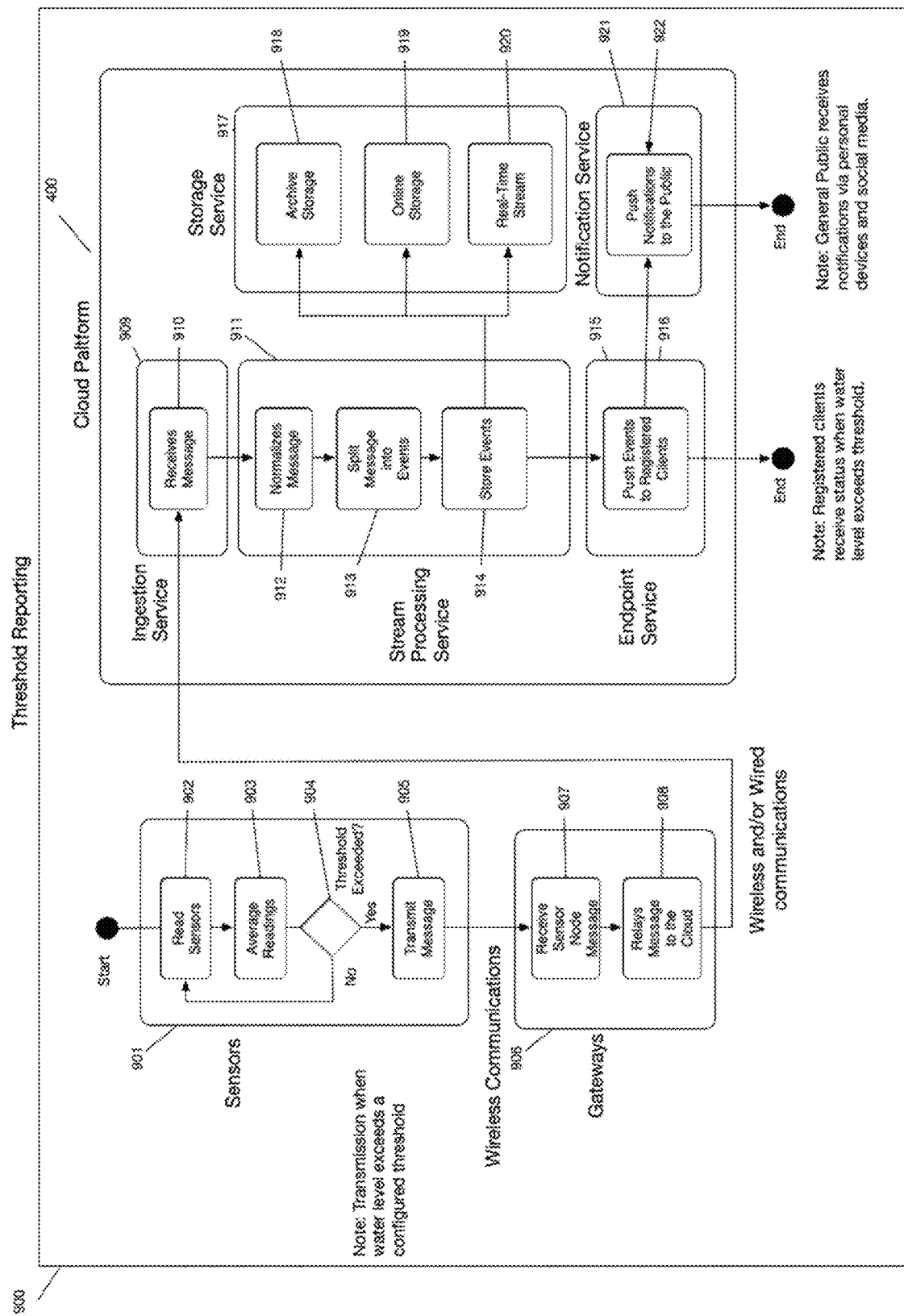
FIG. 12 is a flowchart illustrating an example threshold reporting process performed by an example environmental sensor network consistent with certain embodiments of the present invention.

Turning now to FIG. 12, the figure is a flow diagram for reporting environmental conditions when defined thresholds are met consistent with certain embodiments of the present invention.

In an embodiment, an ESN process 900 is classified as threshold reporting mode, in that the sensor node 200 only reports status when water levels exceed a configured threshold. Process 900 begins with step 902, by reading the sensor node 200 values. In step 903, the sensor node 200 averages the sensor reading to remove data spikes and to smooth output. In step 904, the sensor node 200 compares the water level distance value to a configured threshold value. If the distance value is above the threshold value, the sensor node 200 executes step 905 and will transmit a message. If the distance value is below the threshold, no message is transmitted.

In step 905, the sensor node 200 transmits a message that includes the sensor node 200 unique ID, a timestamp and sensor node 200 readings. The message is transmitted to one or more gateways 300 via a wireless communications protocol.

In step 907, a gateway 300 receives the sensor node 200 message. In step 908, the gateway 300 relays the message to the cloud platform 400 via wireless or wired communications. In a version, the gateway 300 may append, or "wrapper", the sensor node 200 message with additional data. The gateway 300 may append data items such as, but not limited to, the gateway ID and a timestamp. The timestamp indicates the data and time the sensor node message was received by the gateway 300.

In step 910, the ingestion service 410 receives the sensor node message, importing it into the cloud platform 400. The ingestion service 410 places the message into a message queue 436, where it is retrieved by one or more stream processing pipelines. In step 912, the stream processing service 412 normalizes the message by adding a timestamp and geolocation data and assigning the message to a customer domain. In a version, the message may already contain a timestamp and geolocation data. In this case, the stream processing service 412 will make no changes to the message. In step 913, the stream processing service 412 splits the message into discrete environmental events. A message may contain multiple sensor node 200 readings. Step 913 separates these sensor node 200 readings into individual event records, with each record containing a single sensor node 200 reading. Each event record will contain the timestamp, geolocation and assigned domain or the original message. In step 914, the stream processing service 412 stores the event records via the storage service

414. Each event record is written to archive storage 445, online storage 446 and a real-time storage 447.

Once event storage is complete, step 916 pushes the event records to registered consumer devices 500. Registered consumer devices 500 only receive event data when the sensor node 200 reports a message that has exceeded the configured threshold. Registered clients 500 include outdoor devices 504 such as, but not limited to, variable message signs, barriers, flood pumps or flood gates, desktop applications or external customer systems 505. Step 916 also forwards event data to the notification service 422 for publishing to the public. In Step 922, the alert service 420 transmits notification messages to dashboards, smartphone, tablet applications, and to social media.

Figure 13:
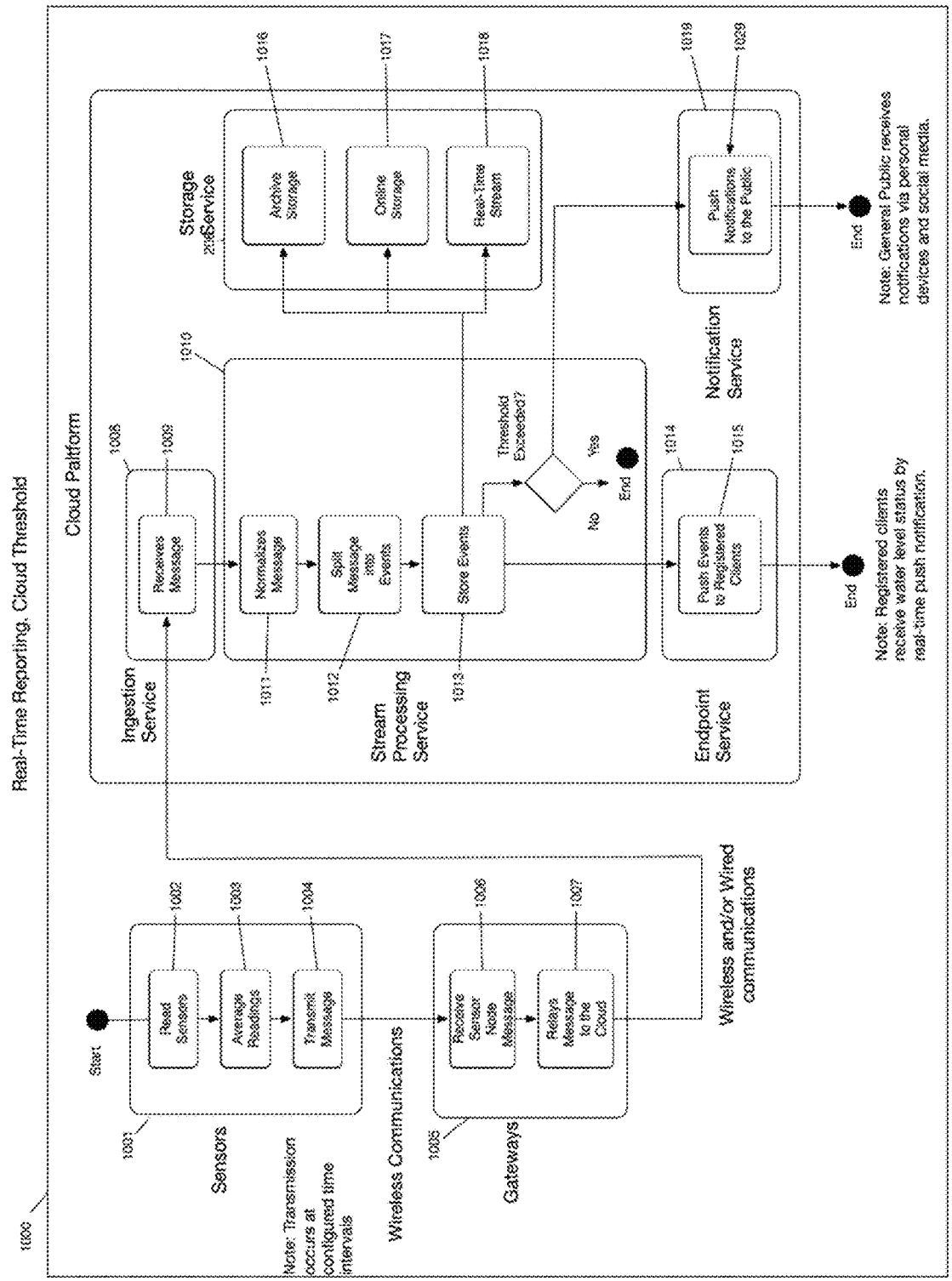
FIG. 13 is a flowchart illustrating an example real-time reporting, cloud threshold reporting process performed by an example environmental sensor network consistent with certain embodiments of the present invention.

Turning now to FIG. 13, the figure is a flow diagram for reporting environmental conditions in real time and transmitting notifications when defined thresholds are met consistent with certain embodiments of the present invention. In an embodiment, in ESN process 1000 threshold checks are performed by the cloud platform 400 stream processing service 412. Process 1000 is classified as real-time reporting with cloud threshold mode. In this exemplary process the sensor nodes 200 report in real time, and the cloud platform 400 performs threshold checks. At step 1002, the sensor node 200 values are read by the system. In step 1003, the sensor node 200 averages the sensor reading, to remove data spikes and to smooth output. In Step 1004, the sensor node 200 compares the water level distance value to a configured threshold value. If the distance value is above the threshold value, the sensor node 200 executes Step 1004 and will transmit a message. If the distance value is below the threshold, no message is transmitted.

In step 1004, the sensor node 200 transmits a message that includes the sensor node 200 unique ID, a timestamp and sensor node 200 readings. The message is transmitted to one or more gateways 300 via a wireless communications protocol.

In step 1006, a gateway 300 receives the sensor node 200 message. In step 1007, the gateway 300 relays the message to the cloud platform 400 via wireless and/or wired communications. In a version, the gateway 300 may append, or "wrapper", the sensor node 200 message with additional data. The gateway 300 may append data items such as, but not limited to, the gateway ID and a timestamp. The timestamp indicates the data and time the sensor node 200 message was received by the gateway 300.

In step 1009, the ingestion service 410 receives the sensor node 200 message, importing it into the cloud platform 400. The ingestion service 410 places the message into a message queue 436, where it is retrieved by one or more stream processing pipelines. In step 1011, the stream processing service 412 normalizes the message by adding a timestamp and geolocation data and assigning the message to a customer domain. In a version, the message may already contain timestamp and geolocation data. In this case, the stream processing service 412 will make no changes to the message. In step 1012, the stream processing service 412 splits the message into discrete environmental events. A message may contain multiple sensor readings. Step 1012 separates these sensor readings into individual event records, with each record containing a single sensor reading. Each event record will contain the timestamp, geolocation and assigned domain or the original message. In step 1013, the stream processing service 412 stores the event records via the storage service 414. Each event record is written to archive storage 445, online storage 446, and a real-time storage 447. Once event storage is complete, Step 1015 pushes the event records to registered consumer devices. Registered consumer devices only receive event data when the sensor node 200 reports a message that has exceeded the configured threshold. Registered consumer devices include outdoor devices 504 such as, by way of non-limiting example, variable message signs, barriers, flood pumps or flood gates, desktop applications or external customer systems 505. Step 1013 also forwards event data to step 1014, which determines if the water level value exceeds a defined threshold. If the threshold is exceeded, Step 1020 sends a notification request to alert service 420. In Step 1020, the alert service 420 transmits a notification message to the public. Notifications are sent to personal devices 503 such as, but not limited to, smartphone, desktop and tablet applications, external client systems 505, and social media 506.

In a non-limiting example, the environmental data reports may comprise information related to current water level elevation and conditions, water level elevation rate of change over time, trending water levels, water level elevation history, water surge conditions, or regional graphical trends.

In another non-limiting example, the environmental condition or trend at one or more node sensors in a geographical area may comprise: current water level elevation, change in water level elevation, history of water level elevation, rate of water elevation change over time, water level elevation compared to historic potential, comparison of water level elevation at a first location with that of a second location within a geographical region, trends of a plurality of conditions, correlation of a plurality of conditions. An alert notification report may be transmitted comprising information related to current water level conditions, trending water levels, areas that are flooding, water surge conditions, and/or regional graphical trends.

Figure 14:
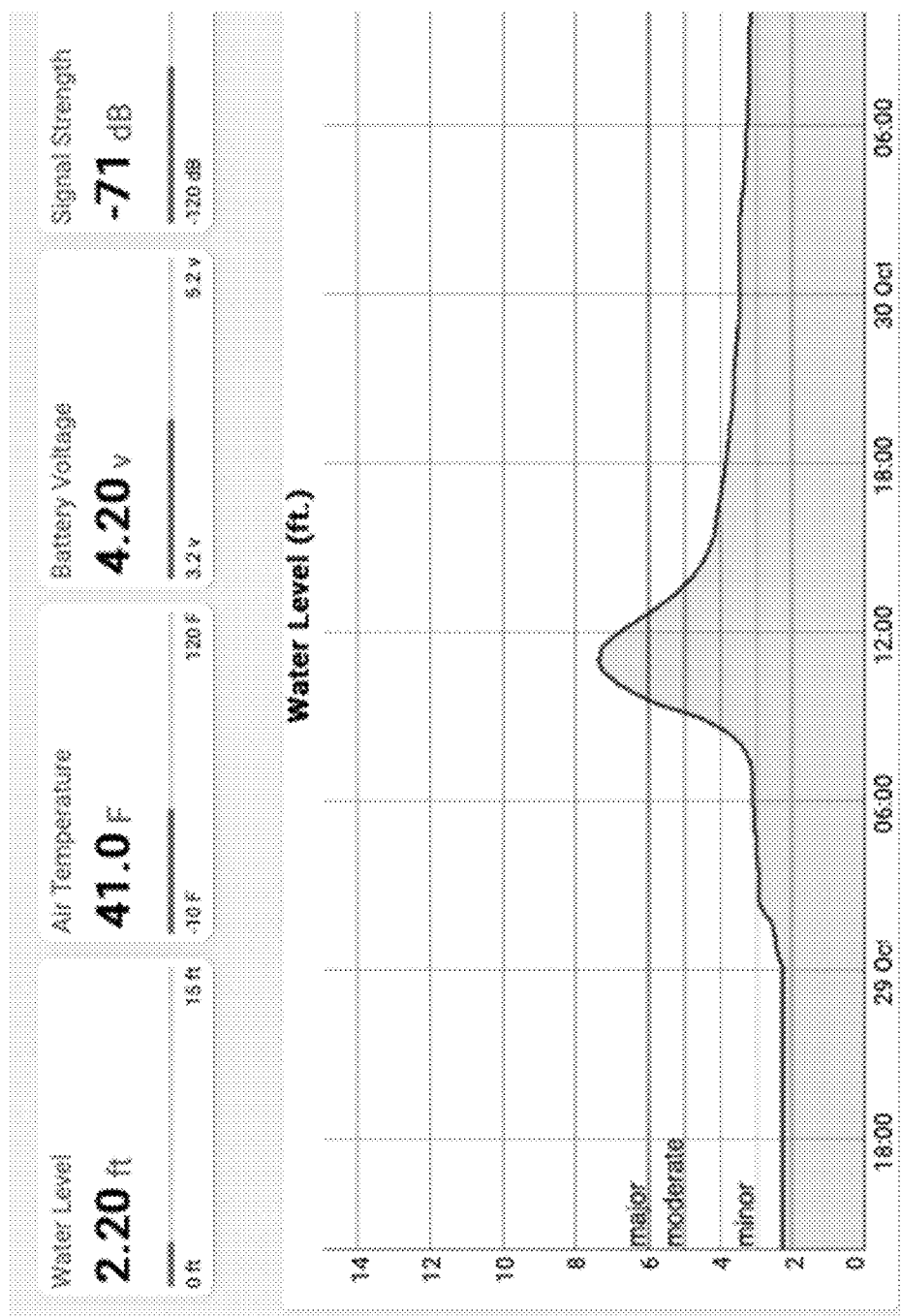
FIG. 14 is an illustrative visual report relating to environmental trends and conditions consistent with certain embodiments of the present invention.

Turning now to FIG. 14, the figure is a flow diagram for a software module configured to receive and display a report consistent with certain embodiments of the present invention. The report may contain environmental trends or conditions and is supplied to one or more users.

Figure 15:
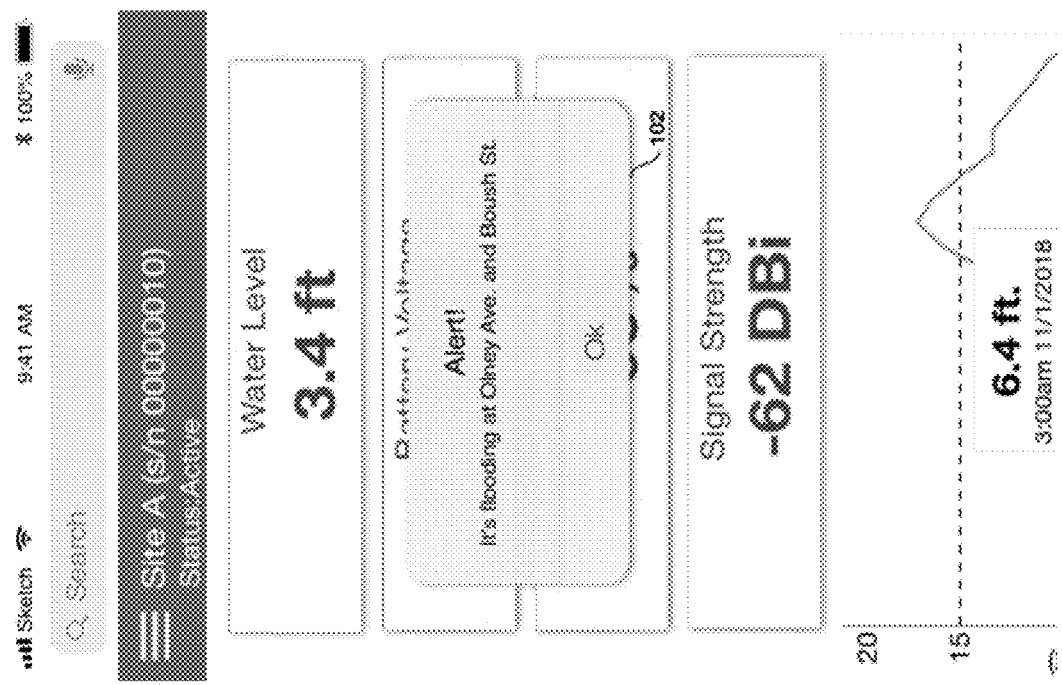
FIG. 15 is an illustrative visual alert example as received on an external client device consistent with certain embodiments of the present invention.

Turning now to FIG. 15, the figure is a flow diagram for a software module configured to provide an alert notification consistent with certain embodiments of the present invention. The alert notification may be provided to one or more users when certain environmental trends or conditions exceed predefined thresholds.

Figure 16:
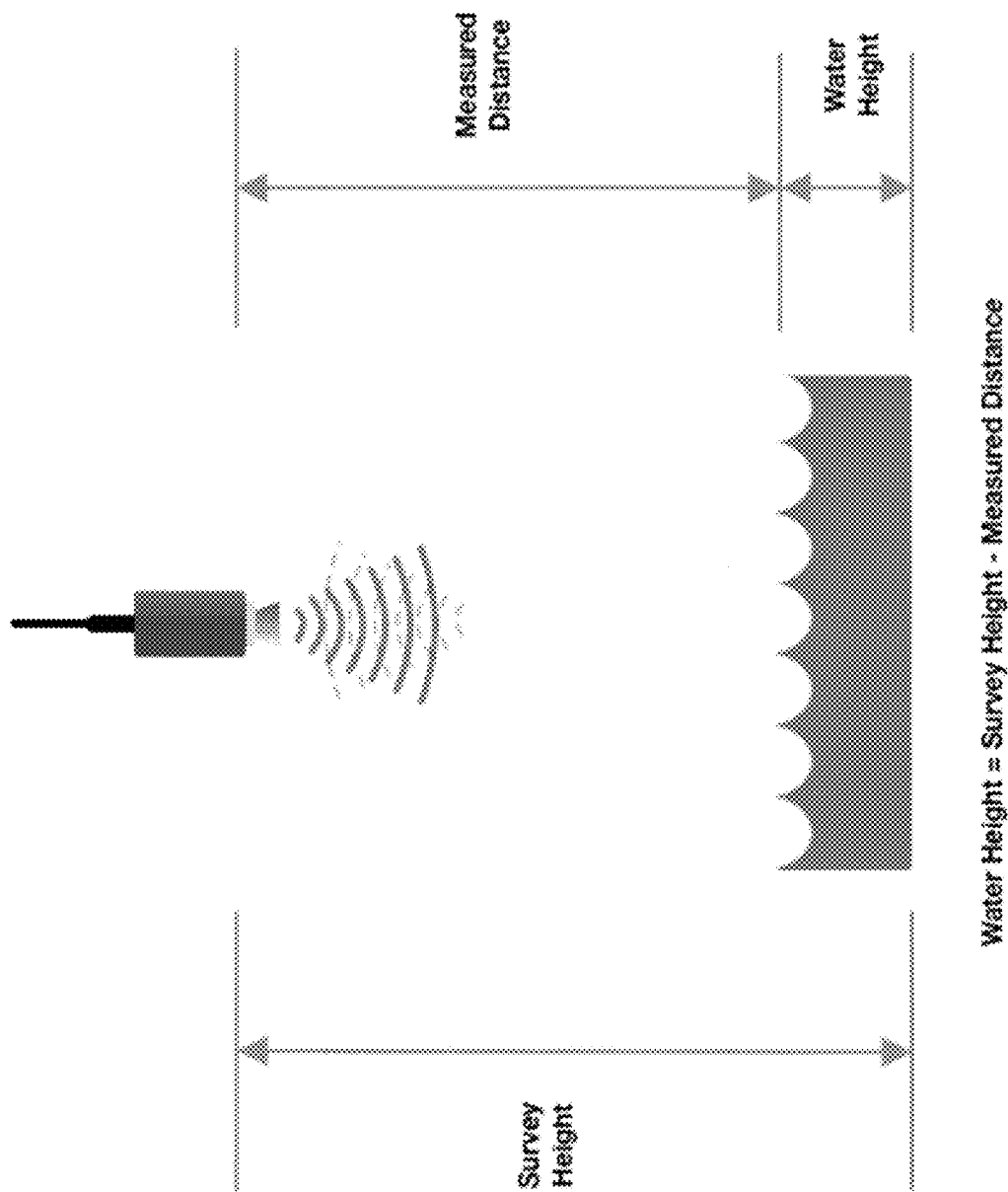
FIG. 16 is an illustrative diagram showing an example non-contact water level sensor providing a measured distance to the water's surface consistent with certain embodiments of the present invention.

Turning now to FIG. 16 this figure presents an illustrative diagram showing an example non-contact water level sensor providing a measured distance to the water's surface consistent with certain embodiments of the invention. The sensor is placed at a known survey height. A non-contact sensor, as described previously, is active to measure the distance from the survey height to the top of the surface of a body of water. The system then calculates the water height as the survey height less the measured distance and reports this figure to the ESN system server or cloud processor.

Turning now to FIG. 17 this figure presents an illustrative diagram showing an example contact water level sensor providing a measured depth consistent with certain embodiments of the invention. A pressure sensor is placed beneath the surface of the water, the sensor being waterproof and of a type that may come into contact with water. The pressure sensor may collect readings in real-time as to the pressure of water that is in contact with the pressure sensor. The pressure readings are transmitted through a power and communications cable to a transceiver, which then communicates the pressure readings as data to the ESN system server or cloud processor.

In an embodiment, the pressure readings are calibrated for the weight of water and an algorithm within the ESN system server or cloud processor may convert the pressure readings into a measurement of water height of the water column above the surface upon which the pressure sensor has been placed.

While certain illustrative embodiments have been described, it is evident that many alternatives, modifications, permutations and variations will become apparent to those skilled in the art in light of the foregoing description.

What is claimed is:

1. A system for monitoring water level elevation at one or more geographical locations, the system comprising:
   a plurality of contact and non-contact sensor nodes, each sensor node associated with a predetermined geographical location and positioned above an adjacent water surface at said predetermined geographical location;
   said sensor nodes measuring rainfall, air humidity, barometric pressure, air temperature, and distance between said sensor nodes and said water surface;
   each of said sensor nodes collecting environmental data pertaining to water level elevation of said water surface level and changes in water level elevation over time and a transceiver connected to each sensor node transmitting said environmental data to a cloud-based server;
   said cloud-based server configured to support real-time stream processing of sensor node environmental data, further comprising:
   a) receiving and ingesting said environmental data;
   b) applying an algorithm to the environmental data to determine an environmental trend or condition predictive of and indicating a water surface level elevation exceeding pre-established water surface level heights and/or flooding conditions for said geographic location;
   c) transmitting an alert notification when said environmental trends or conditions exceed predefined thresholds for said geographic location.

2. The system according to claim 1, further comprising transmitting and displaying either the environmental data report or the alert notification to a user device as a text message, image, or combination of both.

3. The system according to claim 2, where the external consumer device comprises any of external computer systems, social media, cellular phone, a smartphone device, a tablet, a smart watch, or other devices external to the system processor.

4. The system according to claim 1, where at least one sensor node further comprises: a data collection module configured to receive and format said environmental data into a message and to wirelessly transmit said message to any of said external devices.

5. The system according to claim 1, where the cloud-based server manages the plurality of sensor nodes and stores said environmental data within an electronic storage media.

6. The system according to claim 1, where the cloud-based server generates an environmental data report comprising the environmental trend or condition and transmits said environmental data report to an external device.

7. The system according to claim 6, where the environmental data report comprises information related to current water level elevation and conditions, water level elevation rate of change over time, trending water levels, water level elevation history, water surge conditions, or regional graphical trends.

8. The system according to claim 1, where the detector comprises an ultrasonic or RADAR sensor measuring the distance between the sensor and the surface of the water.

9. The system according to claim 1, where the cloud-based server further normalizes the environmental data received from each sensor, where said normalizing comprises removing erroneous data, adding a date and time stamp, adding geolocation data and/or the assignment of the event to a customer domain.

10. The system according to claim 1, where the alert notification comprises information related to current water level conditions, trending water levels, flooding areas, water surge conditions, or regional graphical trends.

11. A platform for monitoring water level elevation at one or more geographical locations, the platform comprising:
   a plurality of sensor nodes, each sensor node associated with a predetermined geographical location, and positioned above an adjacent water surface at said predetermined geographical location;
   where each sensor node comprises one or more environmental detectors, a wireless telemetry module, and a data collection module;
   said sensor nodes measuring rainfall, air humidity, barometric pressure, air temperature, and distance between said sensor nodes and said water surface;
   said data collection module comprising a software module configured to create and transmit an environmental data message containing collected environmental data pertaining to water level elevation of said water surface and changes in water level elevation over time;
   a gateway device configured to receive and route the environmental data, the gateway device comprising an input telemetry module, an output telemetry module, a transceiver; and a gateway data collection module;
   said gateway detection module configured to receive environmental data, apply an algorithm to aggregate and normalize said environmental data, and transmit said environmental data to a cloud-based platform;
   a cloud platform configured to support real-time stream processing of sensor node environmental data, where said real-time stream processing comprises receiving and storing said environmental data, processing said environmental data to identify an environmental trend or condition predictive of and indicating a water surface level elevation exceeding pre-established heights, and/or flooding for said geographic location, generating an environmental data report containing said predictive information, and transmitting said environmental data report to an external client device;
   said external client device configured to receive and display either the environmental data report or an alert notification as a text message, image, or combination of both.

12. The platform according to claim 11, where the external consumer device comprises any of external computer systems, social media, cellular phone, a smartphone device, a tablet, a smart watch, or other devices external to the system processor.

13. The platform according to claim 11, where at least one sensor node further comprises: a data collection module configured to receive and format said environmental data into a message and to wirelessly transmitting said message to any of said external devices or platforms.

14. The platform according to claim 11, where the cloud-based server manages the plurality of sensor nodes and stores said environmental data within an electronic storage media.

15. The platform according to claim 11, where the cloud-based server generates an environmental data report comprising the environmental trend or condition and transmit said environmental data report to an external device.

16. The platform according to claim 15, where the environmental data report comprises information related to current water level elevation and conditions, water level elevation rate of change over time, trending water levels, water level elevation history, water surge conditions, or regional graphical trends.

17. The platform according to claim 11, where the detector comprises an ultrasonic or RADAR sensor measuring the distance between the sensor and the surface of the water.

18. The platform according to claim 11, where the cloud-based server further normalizes the environmental data received from each sensor, where said normalizing comprises removing erroneous data, adding a date and time stamp, adding geolocation data and/or the assignment of the event to a customer domain.

19. The platform according to claim 11, where the alert notification comprises information related to current water level conditions, trending water levels, flooding areas, water surge conditions, or regional graphical trends.

20. The platform according to claim 11, wherein the detector comprises a contact and/or non-contact water level sensor.

* * * * *